US007757252B1

(12) United States Patent
Agasse

(10) Patent No.: US 7,757,252 B1
(45) Date of Patent: Jul. 13, 2010

(54) NAVIGATION SYSTEM FOR A MULTICHANNEL DIGITAL TELEVISION SYSTEM

(75) Inventor: Bernard Agasse, Eragny/oise (FR)

(73) Assignee: Thomson Licensing S.A., Boulogne-Billancourt (FR)

( * ) Notice: Subject to any disclaimer, the term of this patent is extended or adjusted under 35 U.S.C. 154(b) by 0 days.

(21) Appl. No.: 09/744,281

(22) PCT Filed: Jul. 20, 1999

(86) PCT No.: PCT/IB99/01356

§ 371 (c)(1),
(2), (4) Date: Mar. 26, 2001

(87) PCT Pub. No.: WO00/05887

PCT Pub. Date: Feb. 3, 2000

(30) Foreign Application Priority Data

Jul. 20, 1998 (EP) .................................. 98401837

(51) Int. Cl.
*G06F 3/00* (2006.01)
*G06F 13/00* (2006.01)
*H04N 5/445* (2006.01)

(52) U.S. Cl. .............................. 725/41; 725/38; 725/39; 725/40; 725/43; 725/44; 725/45; 725/47; 725/52; 725/56; 725/61; 725/25; 725/27; 725/28; 725/29; 725/30; 725/31; 715/700; 715/719

(58) Field of Classification Search ............. 725/38–61, 725/29, 25–31; 715/700, 719
See application file for complete search history.

(56) References Cited

U.S. PATENT DOCUMENTS

| | | | | |
|---|---|---|---|---|
| 4,685,131 A | * | 8/1987 | Horne | 380/241 |
| 4,694,490 A | * | 9/1987 | Harvey et al. | 380/234 |
| 4,739,510 A | * | 4/1988 | Jeffers et al. | 380/234 |
| 5,036,537 A | * | 7/1991 | Jeffers et al. | 380/241 |
| 5,040,067 A | | 8/1991 | Yamazaki | 358/183 |
| 5,047,858 A | | 9/1991 | Aimonoya | 358/183 |
| 5,144,438 A | | 9/1992 | Kim | 358/183 |
| 5,287,539 A | * | 2/1994 | West, Jr. | 455/1 |
| 5,296,918 A | | 3/1994 | Kim | 348/568 |
| 5,323,462 A | * | 6/1994 | Farmer | 380/209 |
| 5,343,250 A | | 8/1994 | Iwamura | 348/564 |

(Continued)

FOREIGN PATENT DOCUMENTS

EP    0 725 538 A2    8/1996

(Continued)

OTHER PUBLICATIONS

"Instantaneous." Def. 2, Def. 3. Merriam-Webster's Collegiate Dictionary. 10th ed. 1998, p. 606.*

(Continued)

*Primary Examiner*—Christopher Kelley
*Assistant Examiner*—Farzana Hossain
(74) *Attorney, Agent, or Firm*—Osha + Liang LLP

(57) ABSTRACT

The present invention provides a digital television system where access rights to a programme or channel are received analyzed by the decoder in determining whether to permit or prohibit full audio and visual access by the user to that programme or channel when displayed in respective windows of a mosaic formation.

72 Claims, 15 Drawing Sheets

U.S. PATENT DOCUMENTS

| | | | | |
|---|---|---|---|---|
| 5,414,471 | A | 5/1995 | Saitoh et al. | 348/565 |
| 5,434,624 | A | 7/1995 | Ishimura | 348/563 |
| 5,438,372 | A | 8/1995 | Tsumori et al. | 348/365 |
| 5,452,012 | A | 9/1995 | Saitoh | 348/563 |
| 5,485,221 | A | 1/1996 | Banker et al. | 348/563 |
| 5,506,628 | A | 4/1996 | Chun | 348/565 |
| 5,528,304 | A | 6/1996 | Cherrick et al. | 348/565 |
| 5,539,479 | A | 7/1996 | Bertram | 348/564 |
| 5,557,338 | A | 9/1996 | Maze et al. | 348/565 |
| 5,574,494 | A | 11/1996 | Marics | 348/13 |
| 5,585,838 | A * | 12/1996 | Lawler et al. | 725/54 |
| 5,585,866 | A | 12/1996 | Miller et al. | 348/731 |
| 5,589,892 | A | 12/1996 | Knee et al. | 348/731 |
| 5,592,551 | A * | 1/1997 | Lett et al. | 380/211 |
| 5,594,509 | A | 1/1997 | Florin et al. | 348/731 |
| 5,594,794 | A * | 1/1997 | Eyer et al. | 380/231 |
| 5,602,596 | A | 2/1997 | Claussen et al. | 348/564 |
| 5,602,598 | A | 2/1997 | Shintani | 348/565 |
| 5,606,374 | A | 2/1997 | Bertram | 348/565 |
| 5,606,611 | A * | 2/1997 | Kitada | 380/216 |
| 5,633,683 | A | 5/1997 | Rosengren et al. | 348/385 |
| 5,652,628 | A | 7/1997 | Toyoshima et al. | 348/569 |
| 5,657,072 | A | 8/1997 | Aristides et al. | 348/13 |
| 5,663,757 | A * | 9/1997 | Morales | 725/5 |
| 5,682,207 | A | 10/1997 | Takeda et al. | 348/568 |
| 5,691,915 | A | 11/1997 | Funahashi et al. | |
| 5,719,637 | A | 2/1998 | Ohkura et al. | 348/564 |
| 5,751,335 | A * | 5/1998 | Shintani | 725/25 |
| 5,758,259 | A * | 5/1998 | Lawler | 725/45 |
| 5,781,245 | A | 7/1998 | Van Der Weij et al. | 348/563 |
| 5,786,869 | A | 7/1998 | Baek et al. | 348/565 |
| 5,809,204 | A * | 9/1998 | Young et al. | 386/83 |
| 5,815,145 | A | 9/1998 | Matthews, III | 345/327 |
| 5,822,014 | A * | 10/1998 | Steyer et al. | 725/41 |
| 5,822,123 | A | 10/1998 | Davis et al. | 348/564 |
| 5,828,402 | A * | 10/1998 | Collings | 725/28 |
| 5,841,483 | A | 11/1998 | Shafer | 348/565 |
| 5,841,486 | A | 11/1998 | Ando et al. | 348/673 |
| 5,850,218 | A | 12/1998 | LaJoie et al. | 345/327 |
| 5,857,181 | A | 1/1999 | Augenbraun et al. | 707/2 |
| 5,862,299 | A | 1/1999 | Lee et al. | 386/94 |
| 5,867,227 | A | 2/1999 | Yamaguchi | 348/564 |
| 5,872,588 | A * | 2/1999 | Aras et al. | 725/14 |
| 5,874,936 | A * | 2/1999 | Berstis et al. | 715/785 |
| 5,877,817 | A | 3/1999 | Moon | 348/564 |
| 5,880,720 | A | 3/1999 | Iwafune et al. | 345/327 |
| 5,892,508 | A | 4/1999 | Howe et al. | 345/327 |
| 5,900,868 | A | 5/1999 | Duhault et al. | 345/327 |
| 5,903,314 | A | 5/1999 | Niijima et al. | 348/564 |
| 5,926,168 | A | 7/1999 | Fan | 345/158 |
| 5,926,230 | A | 7/1999 | Niijima et al. | 348/564 |
| 5,929,850 | A * | 7/1999 | Broadwin et al. | 725/110 |
| 5,929,932 | A | 7/1999 | Otsuki et al. | 348/569 |
| 5,969,748 | A * | 10/1999 | Casement et al. | 725/27 |
| 5,978,649 | A * | 11/1999 | Kahn | 725/25 |
| 5,986,650 | A | 11/1999 | Ellis et al. | 345/327 |
| 5,991,832 | A | 11/1999 | Sato et al. | 710/33 |
| 5,999,216 | A | 12/1999 | Kaars | 348/385 |
| 5,999,970 | A | 12/1999 | Krisbergh et al. | 709/217 |
| 6,002,444 | A * | 12/1999 | Marshall et al. | 725/41 |
| 6,005,562 | A | 12/1999 | Shiga et al. | 345/327 |
| 6,008,803 | A | 12/1999 | Rowe et al. | 345/327 |
| RE36,509 | E | 1/2000 | Shigihara | 348/564 |
| 6,020,880 | A | 2/2000 | Naimpally | 345/327 |
| 6,020,881 | A | 2/2000 | Naughton et al. | 345/327 |
| 6,020,882 | A | 2/2000 | Kinghorn et al. | 345/327 |
| 6,020,930 | A * | 2/2000 | Legrand | 725/41 |
| 6,023,267 | A | 2/2000 | Chapuis et al. | 345/327 |
| 6,023,287 | A | 2/2000 | Kimura et al. | 348/39 |
| 6,028,599 | A * | 2/2000 | Yuen et al. | 725/50 |
| 6,118,492 | A * | 9/2000 | Milnes et al. | 725/52 |
| 6,166,780 | A * | 12/2000 | Bray | 348/632 |
| 6,181,364 | B1 * | 1/2001 | Ford | 725/32 |
| 6,341,195 | B1 * | 1/2002 | Mankovitz et al. | 386/83 |
| 7,174,512 | B2 * | 2/2007 | Martin et al. | 715/719 |
| 2001/0052135 | A1 * | 12/2001 | Balakrishnan et al. | 725/135 |
| 2003/0101452 | A1 * | 5/2003 | Hanaya et al. | 725/38 |

FOREIGN PATENT DOCUMENTS

| | | |
|---|---|---|
| EP | 825521 A1 | 2/1998 |
| FR | 2 641 152 | 6/1990 |
| JP | 06-006792 A | 1/1994 |
| JP | 06-153193 A | 5/1994 |
| JP | 07-250316 A | 9/1995 |
| JP | 08-289218 A | 11/1996 |
| WO | WO 95/15646 | 6/1995 |
| WO | WO 96/13120 | 5/1996 |
| WO | WO 96/37996 | 11/1996 |

OTHER PUBLICATIONS

CCETT Paper entitled Service Information for Digital Television on Cable and Satellite, by F. Blusseau and J. Y. Savary, dated Dec. 1, 1993, 23 pages.

CCETT Proposal entitled "Service Information for Digital Television on Cable and Satellite", by F. Blusseua and J. Y. Savary, dated Jan. 20-21, 1994, 29 pages.

English Translation of JP06-153193, Publication Date May 31, 1994, 7 pages.

English Translation of JP 06-006792, Publication Date Jan. 14, 1994, 10 pages.

Office Action in Japanese Patent Application No. 2000-561769, mailed Sep. 15, 2009, and English Translation thereof, 7 pages.

* cited by examiner

NAVIGATION SYSTEM FOR A MULTICHANNEL DIGITAL TELEVISION SYSTEM

BACKGROUND OF THE INVENTION

The present invention relates to a multichannel digital television system and, in particular, aspects of a system relating to navigation between channels.

One of the advantages of digital television lies in the number of channels that are available in such systems and the flexibility that is available to the television service provider regarding what channel choices may be made available to a subscriber of the service. Other than a standard set of subscription channels, the system may also include other access controlled channels such as, for example, a pay-per-view channel enabling a subscriber to pay for a particular film, sporting event etc.

In addition, the digital television system may allow access by the viewer to a number of other interactive type services, such as text based programme guides, weather maps etc. These services may be associated with dedicated digital television channels used to carry the information. Other additional menu based services may be provided enabling a user to access certain basic information in a series of pull down menus whilst watching a broadcast programme. These services operate using so-called "pilot" information carried in the same channel as a normal audiovisual channels.

Whilst the viewer benefits from the increased choice available, the large numbers of channels and services that are available may prove distracting and, in practice, a viewer may often have difficulty managing the viewing possibilities available. In addition, existing navigation tools often fail to handle correctly the interface between the navigator and access controlled channels, some of which may not be available to a particular user.

It is an object of the present invention in its broadest and/or specific aspects to overcome some or all of these problems and to facilitate the navigation of the channels by a user whilst respecting access control restrictions.

SUMMARY OF THE INVENTION

In a first aspect, the present invention provides a decoder for controlling the display of a plurality of digital television channels in respective windows of a mosaic formation, said decoder comprising means, for example, an interface, for receiving access rights to one of a programme and a channel, and means, for example, a central processor, for prohibiting full audio and visual access by the user to said one of a programme and a channel when displayed in a said window according to the received access rights.

The use of mosaic format displays of available channels to aid channel navigation is known in the field. However, such mosaic tools allow full access by a user to all available channels, albeit in a reduced form. If digital audio for this channel is also available a user can watch and listen, for example, to the entire of a programme normally only available upon special subscription or payment but here displayed in one window of the mosaic display. The present invention overcomes this problem.

This aspect of the present invention extends to a digital television system comprising a decoder adapted to display a plurality of digital television channels in a mosaic formation, wherein access rights to a programme or channel are received and analysed by the decoder in determining whether to permit or prohibit full audio and visual access by the user to that programme or channel when displayed in a mosaic window.

The decoder preferably comprises means for receiving access rights data together with audiovisual data for creating the mosaic. In order to allow the user to obtain full access rights to a programme and/or channel, the decoder preferably comprises means for issuing a request for full audio and visual access to one of a channel and a programme displayed in a window.

The access rights in formation may be used by the decoder in a number of ways. For example, in an implementation where a cursor is used to select a desired channel and audio information is generated by the decoder in response to the positioning of the cursor, the decoder may be adapted to permit or prohibit the generation of audio information for an access controlled programme or channel.

Thus, the decoder preferably comprises means for generating a cursor for display with the mosaic formation, the cursor being selectively movable over the windows of the mosaic formation to enable selection of a desired window within the mosaic formation. The decoder may comprise means for generating audio information associated with a particular channel in response to the positioning of the cursor over a said window displaying said particular channel, and may also comprise means for prohibiting the generation of said audio information according to the received access rights.

Audio information may be disabled for access controlled programmes or channels at all times if the decoder does not have the associated access rights. Alternatively, audio information may be prohibited if the cursor is positioned on a prohibited mosaic window for longer than a predetermined length of time. Thus, the prohibiting means may be adapted to prohibit the generation of said audio information if the cursor is positioned over said window for longer than a predetermined length of time.

In yet a further embodiment, the interaction of the cursor with a mosaic window may depend on the access rights associated with the programme or channel displayed in that window. For example, the decoder may be adapted to automatically re-position the cursor in the event that the cursor is placed on a prohibited mosaic window corresponding to an access controlled programme or channel. Thus, the decoder preferably comprises means for automatically re-positioning the cursor in the event that the cursor is placed over a said window displaying one of a programme or a channel to which full audio and visual access is prohibited.

This re-positioning may be carried instantaneously, in the sense that the decoder does not allow a cursor to be positioned directly on an access controlled programme or channel displayed in a mosaic window. Alternatively, the repositioning may be carried out after the expiration of a predetermined period of time. Thus, the re-positioning means is preferably adapted to reposition the cursor after the expiration of a predetermined period of time. In the case, for example, where an audio soundtrack is activated if a window is highlighted by a cursor, this time delay allows a user to have full access to a sample of programme for a period of time to enable the user to evaluate the interest of this programme.

The repositioning of the cursor need not depend on the access rights to a channel and/or programme displayed in a window. For example, in addition to or as an alternative to the above, the decoder may comprise means for automatically repositioning the cursory after the expiration of a predetermined period of time. This can enable a user to "surf" across the mosaic, receiving for this predetermined period of time audio information for each window of the mosaic in turn. This surfing mode of operation can be initiated by pressing a pre-designated button on a remote controller.

As an alternative to repositioning the cursor after the expiration of a predetermined period of time, the decoder may be adapted to issue automatically a request for full access rights to a channel and/or programme to which full audio and visual access is prohibited in the event that the cursor is placed over the window displaying said channel and/or programme for a predetermined period of time. This can enable automatic ordering of the full access rights to a programme and/or channel without any further input from the user.

In addition or as an alternative to the above steps, the decoder may also be adapted to generate a message informing a user of the lack of access rights to a programme or channel in the event of the placement of the cursor on a prohibited mosaic window. Thus, the decoder may comprise means for generating a message informing a user of the access rights to one of a programme and a channel in the event of the positioning of the cursor on a said window displaying said one of a programme and a channel.

Alternatively, or in addition, the decoder may simply prohibit the generation of video information in a mosaic window in dependence on the access rights associated with the programme or channel normally displayed in that window. Thus, the decoder may comprise comprising means for prohibiting the generation of at least a portion of video information in a said window in dependence on the access rights to one of a programme and a channel displayed in that window.

Full access by the viewer to at least a portion of the video information displayed in a window may be prohibited by utilising one or more of a number of different methods. For example, the decoder may comprise means for controlling the display of a picture in said window instead of said at least a portion of video information. The picture may comprise a logo associated with the channel displayed in said window, or an image associated with the programme displayed in said window. Alternatively, the decoder may comprise means for controlling the display of an advertisement in said window instead of said at least a portion of video information.

In another alternative, the decoder may comprise means for controlling the display of further video information in said window instead of said at least a portion of video information. This further video information may comprise promotional video information, such as a trailer for a forthcoming programme to be shown on the channel displayed in the window.

Access rights to a programme and/or channel typically comprise information regarding the nature of the programme or channel, such as, for example, whether the channel is a subscription channel, whether the programme is a pay-per-view event and so on. As well as being utilised to permit or prohibit full video and audio access to the programme and/or channel when displayed in a window of a mosaic formation, these and other access rights may be used by the decoder to customise various features of the display.

For example, the decoder may comprise means for changing an attribute of the cursor depending on a characteristic of at least one of the programme and channel displayed in a window over which the cursor is positioned. This characteristic may comprise, for example, the rating (such as adult only, or children's programme) of the programme, the subject matter (for example, sport, wildlife, politics) of the programme, whether the programme is a pay-per-view event, and so on. In addition, programmes and/or channels may be grouped according to a user's selection, for example, of favourite channels, and the cursor attribute changed accordingly whenever it is positioned over a window displaying one of the user's favourite channels. This can ease user identification of certain channels and programmes displayed in the mosaic formation.

Thus, in another aspect of the present invention there is provided a decoder for controlling the display of a plurality of digital television channels in respective windows of a mosaic formation, said decoder comprising means for generating a cursor for display with the mosaic formation, said cursor being movable to select a desired channel within the mosaic formation, and means for changing an attribute of the cursor depending on a characteristic of at least one of a programme and a channel displayed in a window over which the cursor is positioned.

In one embodiment, the changing means is arranged to change the colour of said cursor depending on said characteristic of at least one of a programme and a channel displayed in the window over which the cursor is positioned. However, other attributes of the cursor, such as the size and shape, may be changed according to this characteristic.

The decoder may comprise means for receiving data for assigning said characteristic from a remote control handset associated with the decoder and means for assigning said characteristic in response to said received data. This can enable the user to assign a channel as a favourite channel using the remote controller, for example, by pressing a predetermined button of the controller when the cursor is positioned over the window displaying that channel. Alternatively, the decoder may comprise means for generating a list of channels displayed in the mosaic formation, the user, by pressing appropriate buttons on the remote controller, selecting channels from the list as the favourite channels.

When the user presses a predetermined button on the remote controller when the cursor is positioned over a window, the decoder may arranged to perform one of a number of operations. For example, the decoder may comprise means for tuning the decoder to a channel displayed in the desired window upon selection of the desired window. This can enable the selected channel to be displayed "in full" on the television screen upon selection of the window displaying that channel.

As an alternative, or in addition, the decoder may comprise means for generating a display comprising information regarding the programme displayed in the desired window upon selection of the desired window. For example, a short summary of the programme shown on the channel, together with start time, duration and/or end time, may be displayed upon pressing a predetermined button of the remote controller when the cursor is positioned over the window displaying that channel. Thus, the present invention provides a decoder for controlling the display of a plurality of digital television channels in respective windows of a mosaic formation, said decoder comprising means for generating a cursor for display with the mosaic formation, said cursor being selectively movable over the windows of the mosaic formation to enable selection of a desired window within the mosaic formation, and means for generating a display comprising information regarding the programme displayed in the desired window upon selection of the desired window.

This information may be received by the decoder together with the audiovisual data for that programme and stored in memory of the remote controller for retrieval and display at the request of the user. Alternatively, the decoder may download this information as and when required for display. In another alternative, the decoder may comprise means for communicating with a communications centre to obtain said information regarding the programme displayed in the desired window. The communication means may comprise a modem for dialing up said communications centre to supply a request for said information to the communications centre.

The decoder may further comprise means for generating a display comprising a forthcoming programme schedule for the channel displayed in the desired window upon selection of the desired window. This schedule may be received by the decoder together with the audiovisual data for the displayed channel. Alternatively, the decoder may download this schedule as and when required for display. In another alternative, the decoder may comprise means for communicating with a communications centre to obtain the schedule. The communication means may comprise a modem for dialing up said communications centre to supply a request for the schedule to the communications centre.

Thus, the present invention extends to a decoder for displaying of a plurality of digital television channels in respective windows of a mosaic formation, said decoder comprising means for generating a cursor for display with the mosaic formation, said cursor being selectively movable over the windows of the mosaic formation to enable selection of a desired window within the mosaic formation, and means for generating a display comprising a forthcoming programme schedule for the channel displayed in the desired window upon selection of the desired window.

The forthcoming programme schedule may comprise a textual display of programme schedule information. Alternatively, the forthcoming programme schedule may comprise a display of a plurality of pictorial images associated with respective forthcoming programmes in respective windows of a mosaic formation. Thus, the present invention further extends to a decoder for controlling the display of programming schedule information, said decoder comprising means for generating a display comprising a plurality of pictorial images associated with respective forthcoming programmes on at least one digital television channel in respective windows of a mosaic formation.

The plurality of pictorial images may be associated with forthcoming programmes to be shown simultaneously on respective digital television channels. For example, these forthcoming programmes may be shown on respective digital television channels during a future time period. When the cursor is positioned over one of the images, information regarding the programme, such as the title, start time, duration and/or end time of the programme may be displayed.

At least one of said plurality of pictorial images may comprise video footage associated with the respective forthcoming programme.

In one embodiment, the receiving means is adapted to receive said access rights from a remote control handset associated with the decoder. This can enable the user to prevent video and/or audio access to one or more of the channels displayed in windows of the mosaic formation, for example, the user may wish to restrict all access to channels which normally show adult programmes. For example, when the cursor is positioned over a window to which the user wishes to restrict all access, the user can, by pressing one or more buttons on the remote control, instruct the decoder to prevent all access to the channel displayed in that window.

Preferably, the receiving means is adapted to receive a PIN number from the remote control handset, said decoder comprising means for authenticating the received PIN number and, upon authentication of the received PIN number, permitting reception of the access rights. This can add a level of security to the transmission of access rights, thereby preventing the access rights to be altered by an unauthorised user.

In one mode of operation, the channels are displayed in a formation which is determined by the broadcaster of the audiovisual data for the channels. Thus, various favourite channels of the user may be randomly spread about the mosaic formation. In order to enable the positions of the various windows in the formation, in one embodiment, the decoder comprises positional control means for controlling the relative positions of said windows within the mosaic formation. In one arrangement, the positional control means may be arranged to control the relative positions of said windows in response to the received access rights to the channels or programmes displayed in said windows. For example, pay-per-view programmes and channels to which the user does not have full access rights may be shown in neighbouring windows of the mosaic formation.

Thus, the present invention extends to a decoder for controlling the display of a plurality of digital television channels in respective windows of a mosaic formation, said decoder comprising positional control means for controlling the relative positions of said windows within the mosaic formation.

In one embodiment, the positional control means is arranged to control the relative positions of said windows in response to received window positioning data for controlling the relative positions of said windows within the mosaic formation. In one arrangement, the decoder comprises means for receiving from a remote control handset associated with the decoder said window positioning data. This can enable the relative positions of the windows in the mosaic formation to be changed easily by the user, for example, by pressing one or more buttons of the remote control. Thus, the present invention also extends to a decoder for controlling the display of a plurality of digital television channels in respective windows of a mosaic formation, said decoder comprising means for receiving from a remote control handset associated with the decoder window positioning data, and positional control means for controlling the relative positions of said windows within the mosaic formation in response to the received positioning data.

The positional control means may be arranged to control the relative positions of the windows of the mosaic formation according to a programme characteristic of programmes normally shown on the channels displayed in the windows. For example, the positional control means may be arranged to group together windows which normally show programmes having the same theme, such as sport, wildlife, children's programmes, adult programmes, and so on. Additionally, or alternatively, the positional control means may be arranged to group together windows which display channels which normally show pay-per-view events.

The positional control means may be arranged to maintain a window displaying one of a particular channel and a particular programme in a constant position in the mosaic formation. For example, that window may be that window of the mosaic formation displaying the channel displayed immediately before the display of the mosaic formation.

The present invention also provides a decoder comprising:
  means for storing a plurality of interactive applications;
  means for generating a display comprising a plurality of pictorial images in respective windows of a mosaic formation, each pictorial image being associated with a respective interactive application;
  means for generating a cursor for display with the mosaic formation, said cursor being selectively movable over the windows of the mosaic formation to enable selection of a desired window within the mosaic formation; and
  means for executing an interactive application upon selection of the window displaying a pictorial image associated with that interactive application The invention further extends to a digital television system comprising a decoder as aforementioned and transmission means adapted to transmit access rights data together with the audiovisual data used to create the mosaic. This information may comprise a configuration list, updated every 24 hours or so and listing the access rights for programmes to be broadcast for the next 24 hour period. Upon reception of the list, the decoder may compare the access rights with the rights available to the decoder before carrying out the steps described above.

The transmission means may further be adapted to receive audiovisual information from a plurality of channels and to process this information in dependence on the access rights to each programme or channel forming the mosaic. For example, in the case of an adult emission or an adult channel, it may be preferable to simply black out at all times the corresponding mosaic window that should show this channel. As will be appreciated, this may be carried out in addition or as an alternative to the steps carried out at the decoder to limit the mosaic display and/or movement of the cursor.

The present invention also provides a method of controlling the display of a plurality of digital television channels in respective windows of a mosaic formation, comprising receiving access rights to one of a programme and a channel, and prohibiting full audio and visual access by the user to said one of a programme and a channel when displayed in a said window according to the received access rights.

The present invention also provides a method of controlling the display of a plurality of digital television channels in respective windows of a mosaic formation, comprising generating a cursor for display with the mosaic formation, said cursor being movable to select a desired channel within the mosaic formation, and changing an attribute of the cursor depending on a characteristic of at least one of the programme and channel displayed in the window over which the cursor is positioned.

The present invention also provides a method of controlling the display of a plurality of digital television channels in respective windows of a mosaic formation, comprising generating a cursor for display with the mosaic formation, said cursor being selectively movable over the windows of the mosaic formation to enable selection of a desired window within the mosaic formation, and generating a display comprising information regarding the programme displayed in the desired window upon selection of the desired window.

The present invention also provides a method of displaying of a plurality of digital television channels in respective windows of a mosaic formation, comprising generating a cursor for display with the mosaic formation, said cursor being selectively movable over the windows of the mosaic formation to enable selection of a desired window within the mosaic formation, and generating a display comprising a forthcoming programme schedule for the channel displayed in the desired window upon selection of the desired window.

The present invention also provides a method of controlling the display of programming schedule information, comprising generating a display comprising a plurality of pictorial images associated with respective forthcoming programmes on at least one digital television channel in respective windows of a mosaic formation.

The present invention also provides a method of controlling the display of a plurality of digital television channels in respective windows of a mosaic formation, comprising controlling the relative positions of said windows within the mosaic formation.

The present invention further provides a method of controlling the display of a plurality of digital television channels in respective windows of a mosaic formation, comprising receiving from a remote control handset associated with the decoder window positioning data, and controlling the relative positions of said windows within the mosaic formation in response to the received positioning data.

The present invention also provides a method of controlling a decoder, said method comprising the steps of:
storing a plurality of interactive applications;
generating a display comprising a plurality of pictorial images in respective windows of a mosaic formation, each pictorial image being associated with a respective interactive application;
generating a cursor for display with the mosaic formation, said cursor being selectively movable over the windows of the mosaic formation to enable selection of a desired window within the mosaic formation; and
executing an interactive application upon selection of the window displaying a pictorial image associated with that interactive application.

Apparatus features as described are also applicable to method aspects of the present invention, and vice versa.

As used herein, the term "digital television system" includes any transmission system for transmitting or broadcasting for example primarily audiovisual or multimedia digital data. Whilst the present invention is particularly applicable to a broadcast based digital television system, the invention may also be applicable to a fixed telecommunications network for multimedia internet applications, to a closed circuit television network, and so on. The term equally includes a system using any satellite, terrestrial, cable or other communication link.

The term "decoder" or "receiver/decoder" used herein may connote a receiver for receiving either encoded or non-encoded signals, for example, television and/or radio signals, which may be broadcast or transmitted by some other means. The term may also connote a decoder for decoding received signals. Embodiments of such receiver/decoders may include a decoder integral with the receiver for decoding the received signals, for example, in a "set-top box", such a decoder functioning in combination with a physically separate receiver, or such a decoder including additional functions, such as a web browser or a video recorder or a television.

BRIEF DESCRIPTION OF THE DRAWINGS

There will now be described, by way of example only, a preferred embodiment of the present invention, with reference to the attached figures, in which.

DETAILED DESCRIPTION OF THE INVENTION

Figure 1:
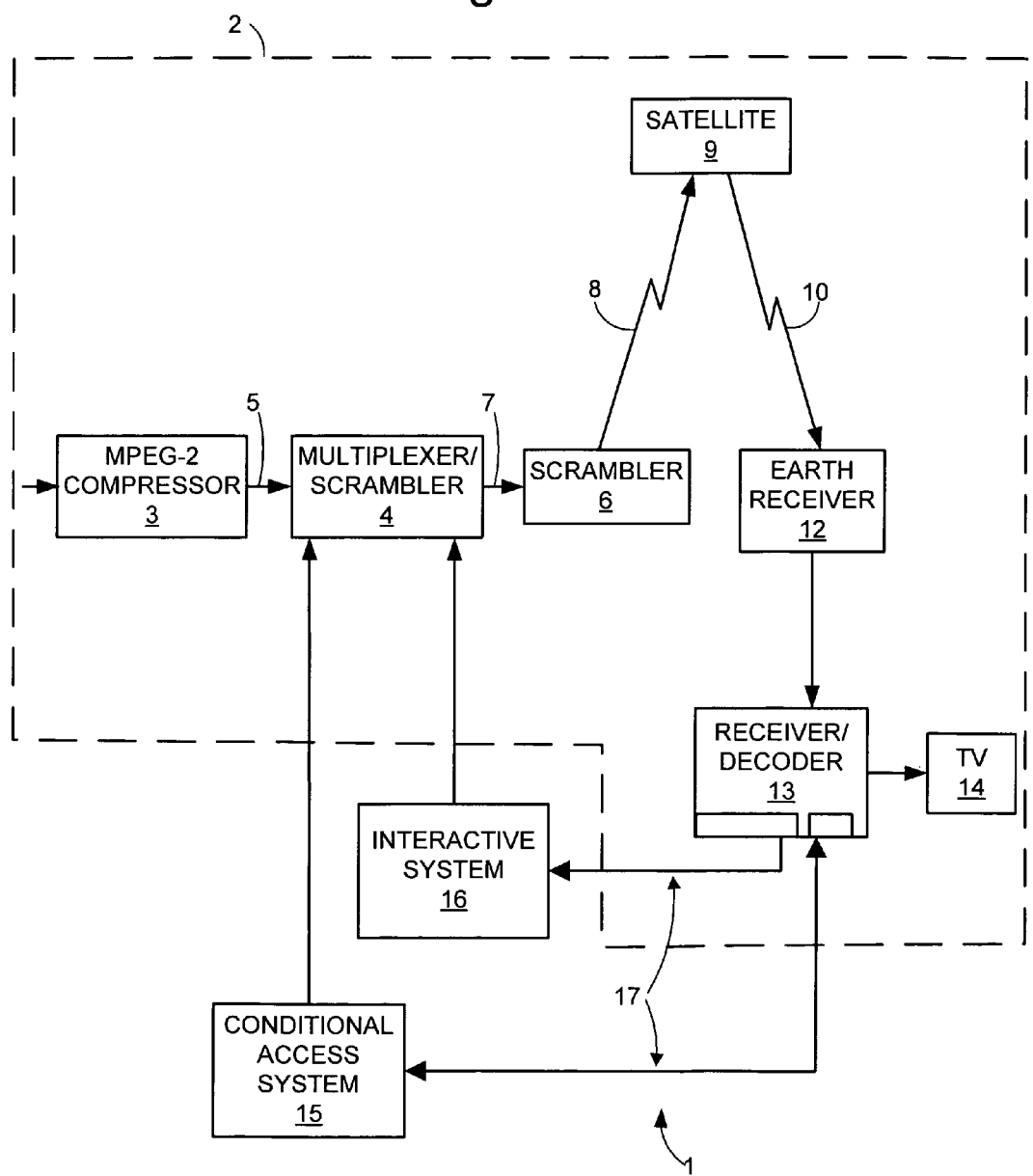
FIG. 1 shows a digital television system as may be adapted according to the present invention.

An overview of a digital television system 1 is shown in FIG. 1. The invention includes a mostly conventional digital television system 2 that uses the known MPEG-2 compression system to transmit compressed digital signals. In more detail, MPEG-2 compressor 3 in a broadcast centre receives a digital signal stream (typically a stream of video signals). The compressor 3 is connected to a multiplexer and scrambler 4 by linkage 5.

The multiplexer 4 receives a plurality of further input signals, assembles the transport stream and transmits compressed digital signals to a transmitter 6 of the broadcast centre via linkage 7, which can of course take a wide variety of forms including telecommunications links. The transmitter 6 transmits electromagnetic signals via uplink 8 towards a satellite transponder 9, where they are electronically processed and broadcast via notional downlink 10 to earth receiver 12, conventionally in the form of a dish owned or rented by the end user. The signals received by receiver 12 are transmitted to an integrated receiver/decoder 13 owned or rented by the end user and connected to the end user's television set 14. The receiver/decoder 13 decodes the compressed MPEG-2 signal into a television signal for the television set 14.

Other transport channels for transmission of the data are of course possible, such as terrestrial broadcast, cable transmission, combined satellite/cable links, telephone networks etc.

In a multichannel system, the multiplexer 4 handles audio and video information received from a number of parallel sources and interacts with the transmitter 6 to broadcast the information along a corresponding number of channels. In addition to audiovisual information, messages or applications or any other sort of digital data may be introduced in some or all of these channels interlaced with the transmitted digital audio and video information.

A conditional access system 15 is connected to the multiplexer 4 and the receiver/decoder 13, and is located partly in the broadcast centre and partly in the decoder. It enables the end user to access digital television broadcasts from one or more broadcast suppliers. A smartcard, capable of deciphering messages relating to commercial offers (that is, one or several television programmes sold by the broadcast supplier), can be inserted into the receiver/decoder 13. Using the decoder 13 and smartcard, the end user may purchase commercial offers in either a subscription mode or a pay-per-view mode.

As mentioned above, programmes transmitted by the system are scrambled at the multiplexer 4, the conditions and encryption keys applied to a given transmission being determined by the access control system 15. Transmission of scrambled data in this way is well known in the field of pay TV systems. Typically, scrambled data is transmitted together with a control word for descrambling of the data, the control word itself being encrypted by a so-called exploitation key and transmitted in encrypted form.

The scrambled data and encrypted control word are then received by the decoder 13 having access to an equivalent to the exploitation key stored on a smart card inserted in the decoder to decrypt the encrypted control word and thereafter descramble the transmitted data. A paid-up subscriber will receive, for example, in a broadcast monthly ECM (Entitlement Control Message) the exploitation key necessary to decrypt the encrypted control word so as to permit viewing of the transmission.

An interactive system 16, also connected to the multiplexer 4 and the receiver/decoder 13 and again located partly in the broadcast centre and partly in the decoder, enables the end user to interact with various applications via a modem back channel 17. The modem back channel may also be used for communications used in the conditional access system 15. An interactive system may be used, for example, to enable the viewer to communicate immediately with the transmission centre to demand authorisation to watch a particular event, download an application etc.

Figure 2:
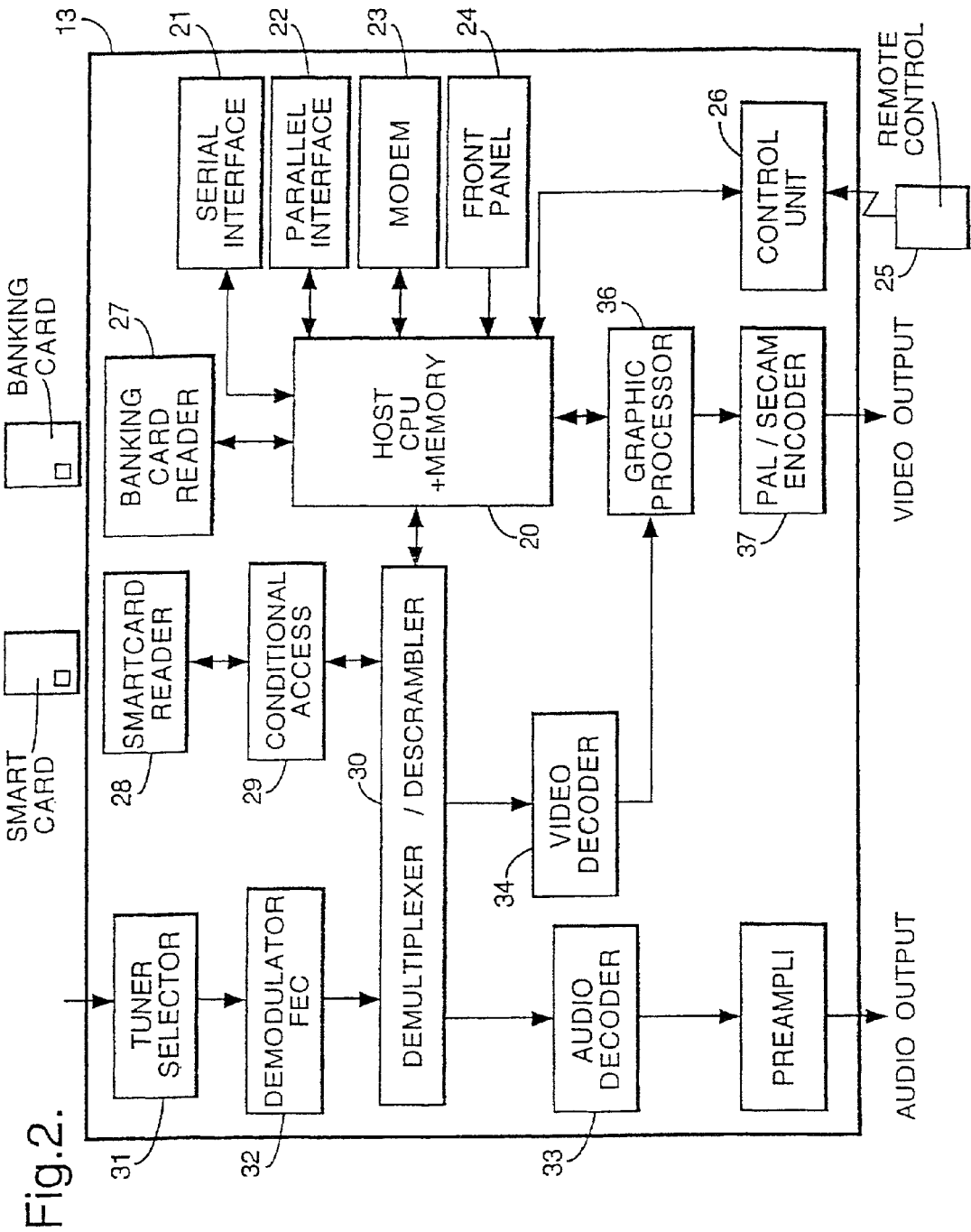
FIG. 2 shows an overview of the elements of a decoder for use in a digital television system.

Referring to FIG. 2, the elements of the receiver/decoder 13 or set-top box will now be described. The elements shown in this figure will be described in terms of functional blocks.

The decoder 13 comprises a central processor 20 including associated memory elements and adapted to receive input data from a serial interface 21, a parallel interface 22, a modem 23 (connected to the modem back channel 17 of FIG. 1), and switch contacts 24 on the front panel of the decoder.

The decoder is additionally adapted to receive inputs from an infra-red remote control 25 via a control unit 26 and also possesses two smartcard readers 27, 28 adapted to read bank or subscription smartcards 29, 30 respectively. The subscription smartcard reader 28 engages with an inserted subscription card 30 and with a conditional access unit 29 to supply the necessary control word to a demultiplexer/descrambler 30 to enable the encrypted broadcast signal to be descrambled. The decoder also includes a conventional tuner 31 and demodulator 32 to receive and demodulate the satellite transmission before being filtered and demultiplexed by the unit 30.

Processing of data within the decoder is generally handled by the central processor 20. In the case of received audio and video signals, the MPEG packets containing these signals will be demultiplexed and filtered so as to pass real time audio and video data in the form of a packetised elementary stream (PES) of audio and visual data to dedicated audio and video processors or decoders 33, 34. The converted output from the audio processor 33 passes to a preamplifier 35 and thereafter via the audio output of the receiver/decoder. The converted output from the video processor 34 passes via a graphic processor 36 and PAL/SECAM encoder 37 to the video output of the receiver/decoder.

With reference to FIG. 2, the graphic processor 36 is preferably designed to generate a screen display combining moving images together with overlaid text or other images. More specifically it can combine 4 layers; a stills layer, a moving image layer, a graphics layer, and a cursor layer. The graphic processor 36 additionally receives graphic data for display (such as generated images etc) from the central processor 20 and combines this information with information received from the video processor 34 to generate the screen display.

The software architecture of the central processor may correspond to that used in a known decoder and will not be described here in any detail. It may be based, for example, on a virtual machine interacting via an interface layer with a lower level operating system implemented in the hardware components of the decoder. In terms of the hardware architecture, the decoder will be equipped with a processor, memory elements such as ROM, RAM, FLASH memory etc. as in known decoders.

The central processor 20 may be adapted to run a number of applications defining the functionality of the decoder. An application introduced into the decoder corresponds to a section of code introduced into the machine that permits the control, for example, of higher level functions of the machine. Typical applications may include the generation of a graphic sequence on the screen of the television display in response to a command from the remote control, or the emission of a message via the decoder modem to the server associated with the digital broadcast system.

As will be later described, an application according to the present invention is adapted to generate display screens, cursors and programme information laid over or replacing the normal television display and associated with navigation between a number of channels or interactive services proposed by the system. The information displayed may comprise substantially invariable menu data and/or data updated using information contained in the MPEG transport stream of one or more channels.

Applications may be resident applications stored in the ROM or FLASH of the decoder or applications broadcast and downloaded via an interface of the decoder or, indeed, such as the serial interface 21, a smart card reader 27 etc. Applications can include navigation tools, program guide applications, games, interactive services, teleshopping applications, as well as initiating applications to enable the decoder to be immediately operational upon start-up and applications for configuring the decoder.

Applications are stored in memory locations in the decoder and represented as resource files comprising graphic object description files, unit files, variables block files, instruction sequence files, application files, data files etc.

Conventionally, applications downloaded into the decoder via the broadcast link are divided into modules, each module corresponding to one or more MPEG tables. Each MPEG table may be divided into a number of sections. In the case where data transfer also occurs via the serial and parallel ports, modules are similarly split into tables and sections, the size of the sections depending on the channel used.

In the case of broadcast transmission, modules are transported in the form of data packets within respective types of data stream, for example, a video data stream, an audio data stream, a text data stream. In accordance with MPEG standards each packet is preceded by a Packet Identifier (PID) of 13 bits, one PID for every packet transported in the MPEG stream. For a given frequency channel, one or more programme map tables (PMTs) contain a list of the different data streams within that channel and define the content of each stream by reference to its respective PID. The PMT table or tables are accessible via a principal Programme Access Table (PAT).

In a digital broadcast system, information is carried on a plurality of frequency channels of a fixed and predetermined bandwidth. Within a single frequency channel, a plurality of audio and/or visual data streams may be contained. For example, a single video stream may be associated with a plurality of audio streams, dubbing the programme into a number of languages. Alternatively or in addition, multiple video streams may be contained in the packet stream associated with the frequency channel and showing, for example, the same sporting event from different camera positions. Whilst these different audio and video streams are broadcast within the same frequency channel, the viewer may perceive changing the audio/video stream within that frequency channel as corresponding to a real change of channel.

In addition to conventional audiovisual programme information, other data may be carried in a frequency channel. As will be described below, this data may include menu display information associated with up-dated programme summaries etc. The PID values of such data may again be available via a PMT table.

In order to provide a constant interface, some information is of necessity broadcast on all frequency channels. For example, the information associated with a "Pilot" type application indicating basic programme information and options available to a user may be broadcast on all frequency channels, such that a user may always call up this information, regardless of the programme or channel being watched. In this way, continuity of the interface is assured.

Figure 3:
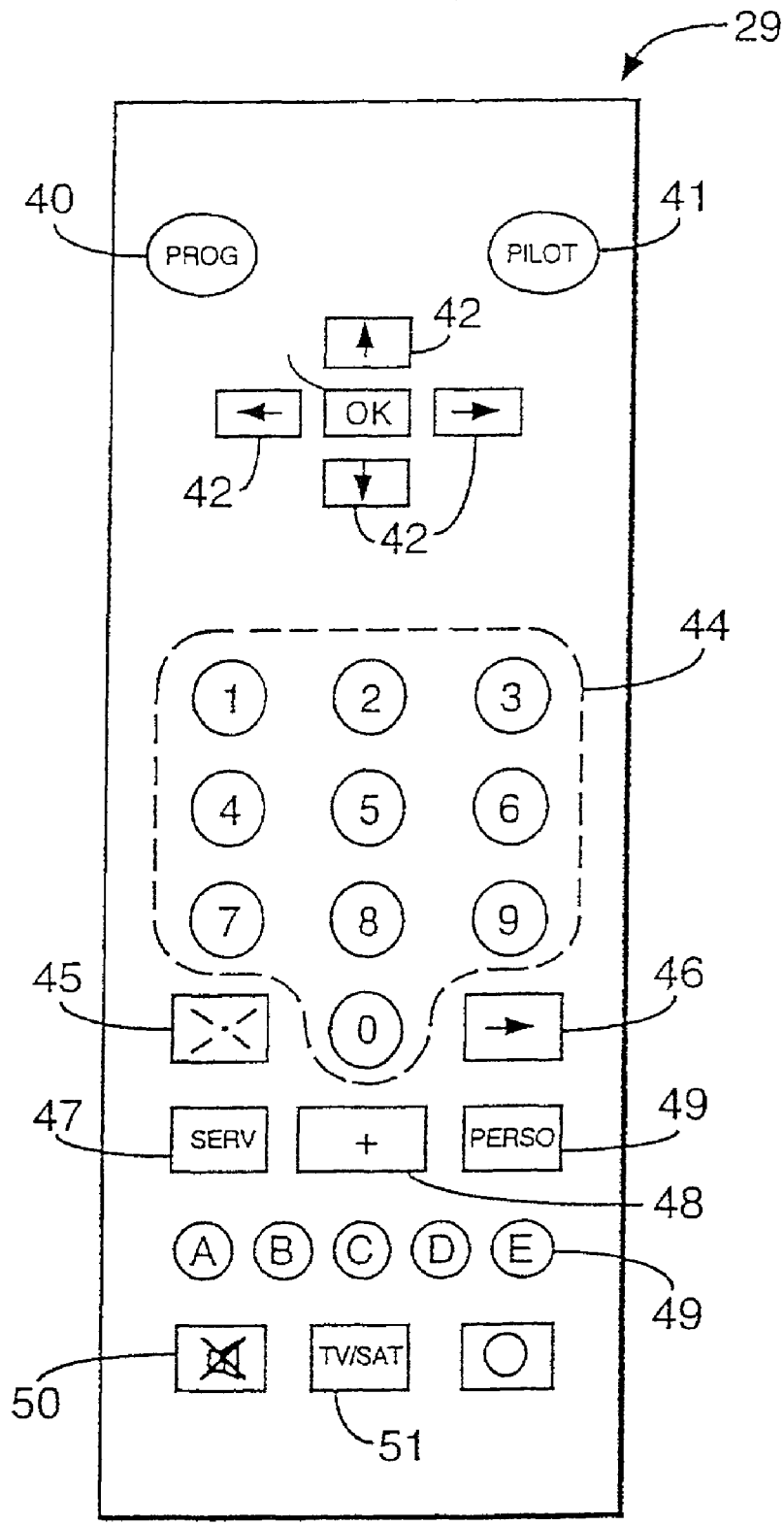
FIG. 3 shows a handset remote control for use with the decoder of FIG. 2.

Referring to FIG. 3, the set of controls associated with the remote control handset 25 of the receiver/decoder will now be described. This remote control layout corresponds to that currently supplied with the existing Canal+ Mediahighway digital decoder system. As will be understood, the response by the decoder to the activation of a particular control on the handset is programmable and may vary according to the application loaded in the decoder. Thus, while certain functions (on/off, mute etc.) are universal, others may change according to the decoder configuration.

As shown, the handset 25 includes a PROG control 40 and PILOT control 41. In the existing Canal+ Mediahighway decoder system, these controls respectively call up a programme guide listing the programmes available on each channel and a pilot application giving information regarding the programme being watched on the present channel as well as a certain amount of information regarding other programmes to be shown on this and other channels at that moment, in the near future etc.

In the context of present application, activation of the PROG control 40 of the handset calls up a more generalised main service menu, the programme guide being accessible as an option within this menu, alongside other services such as interactive shopping applications etc. The application called up by the PILOT control 41 remains largely unchanged.

The handset further includes a set of directional navigation buttons 42 for controlling movement of an on-screen cursor within a menu display, as well as an "OK" control button 43 for selection of an item highlighted by the cursor.

A set of numerical buttons 44 enable direct selection of a numbered channel, entry of numerical data such as credit card numbers, PIN numbers etc. The numerical controls 44 may also be associated with entry of a secondary set of data, such as the days of the week, day/night/evening etc. This data may be printed above the controls and can be used when programming a timer application, navigating a programme guide etc.

The handset 25 further includes a preference control button 45 giving access to a menu list of a limited number of preferred channels, as chosen by the user. In this way, the user can channel quickly between the channels that he or she watches the most often. The control button 46 is used to exit from an activated application or display menu.

The SERV control button 47 is used to call up a summary of the services available within an activated application, such as a users guide to a shopping application.

The "+" control button 48 gives access to a menu permitting choice of sub-titles in a number of languages and/or choice of language used in the audio soundtrack accompanying the displayed programme.

The PERSO control button 49 calls up an application enabling a user to set and personalise certain basic functions of the decoder, including the volume of the audio output from the decoder, characteristics of the video output of the decoder etc.

The A to E control buttons 50 are not generally associated with a particular type of function but may be used by certain applications and at the option of the programmer to activate particular functions such as return to a previous menu etc.

Finally, the mute control button 51 deactivates or activates the sound accompanying the displayed channel, the TV/SAT control 52 enables the user to switch between channels received via a satellite input and those received via a terrestrial antenna, and the standby button 53 enables the user to remotely switch the decoder on and off.

Figure 4:
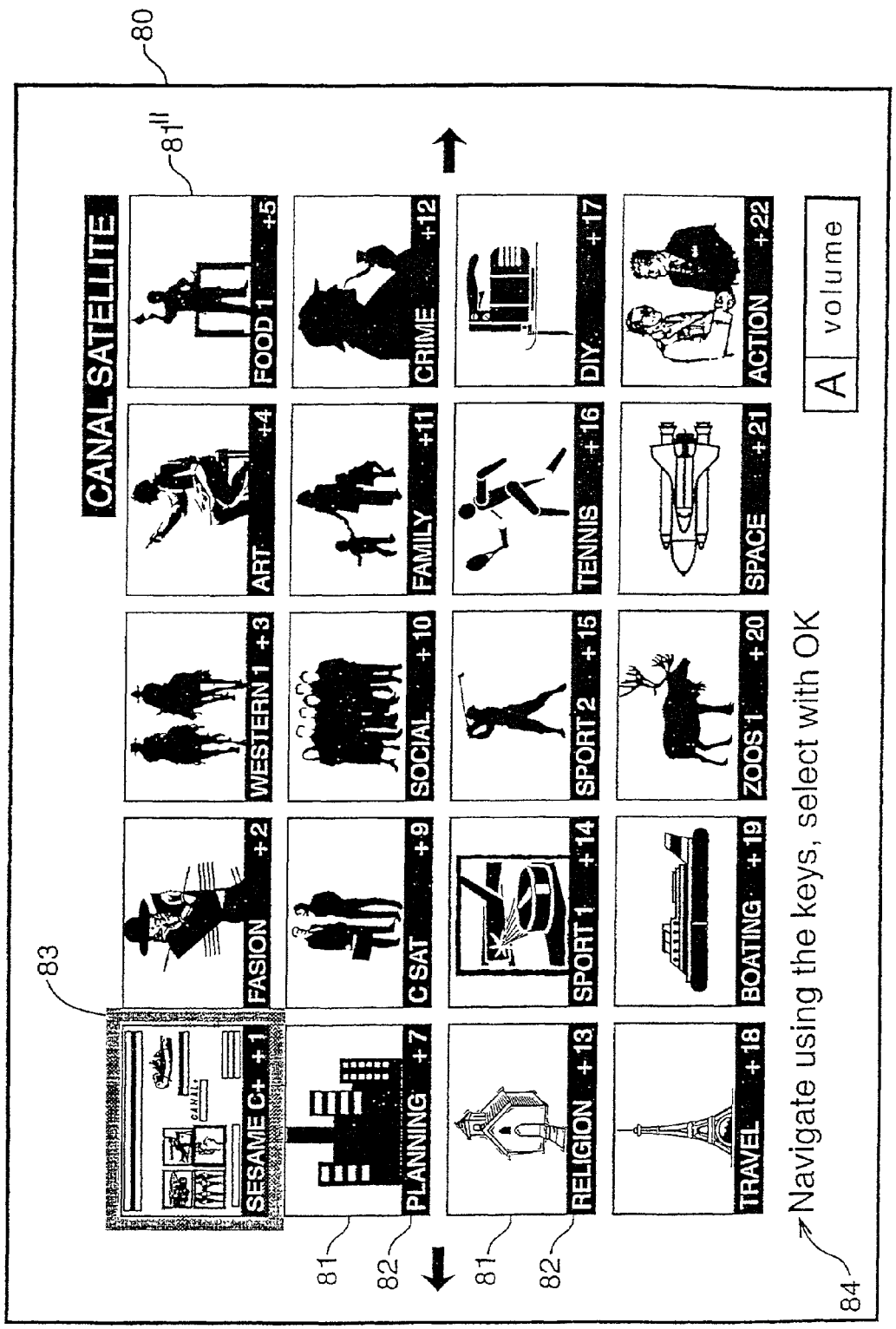
FIG. 4 shows a screen display associated with a first embodiment of a mosaic of channels.

Referring to FIG. 4, one of the services offered is a grille or mosaic formation showing the content of all channels currently being broadcast to the decoder. Upon selection of this service, the decoder changes to the frequency channel associated with this service and the mosaic 80 shown in FIG. 4 is displayed. In this embodiment, the mosaic 80 is broadcast on channel number 8 and so when the numerical button "8" is selected on the remote control the decoder tunes to this frequency channel. In an alternative embodiment, the remote control may include a dedicated control button for tuning to this frequency channel.

The mosaic 80 is composed of a number of miniature screen display windows 81 each showing in real time the programme being shown on a channel and each including at 82 an indication of the name of the channel shown in the display window 81. The mosaic also includes a general information bar 84.

An application within the decoder generates a movable frame cursor shown at 83.

Figure 5:
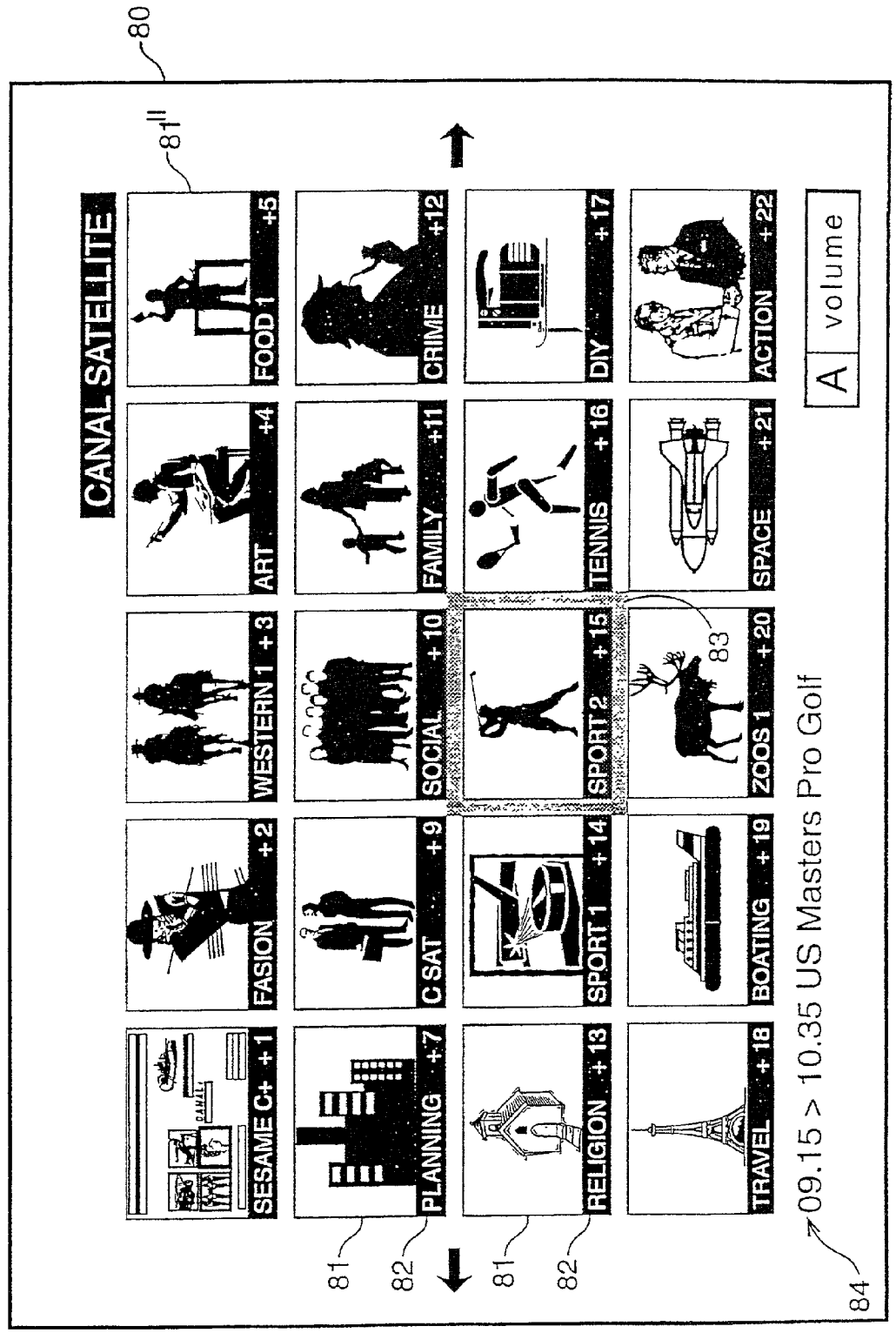
FIG. 5 shows the cursor in a different position in the screen display of FIG. 4.

This cursor may be moved horizontally and vertically using the navigation arrows of the remote control. For example, in FIG. 5, the cursor 83 has been moved to select the third-down, third-across window. The title of the programme currently being shown on the channel displayed in this window is displayed in the display bar 84. The decoder additionally selects and plays the audio stream associated with this channel. Pressing "OK" on the remote control then causes the decoder to tune to the channel shown in that window.

Figure 6:
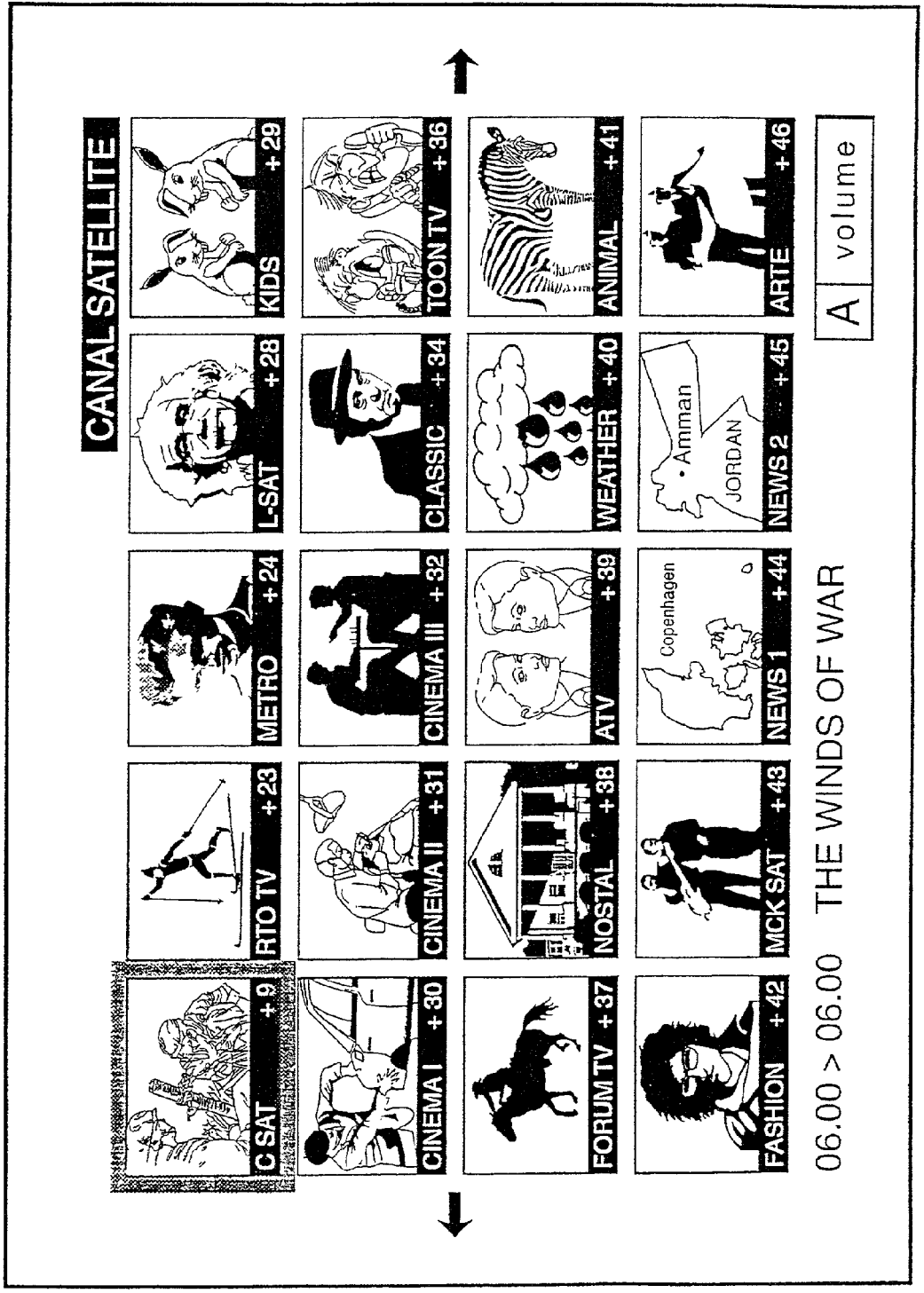
FIG. 6 shows another screen display associated with a mosaic of channels

The mosaic shown in FIG. 4 displays 20 channels. In practice, up to 60 or more channels may be receivable by the decoder. In this case, access to other programme mosaics may be necessary. For example, when the cursor is positioned over window 84" as shown in FIG. 4, selection of the right facing navigation arrow will cause the display to change to another mosaic of 20 programmes, as shown in FIG. 6. Similarly, when the cursor is in the left hand side of the grille 80, selection of the left facing navigation arrow will cause the display to change to show another programme mosaic. The mosaic screens may also be looped such that exit of the last mosaic screen will bring the user back to the first screen etc.

The programme mosaic shown in FIG. 4 displays a selection of all programme channels broadcast to the decoder. However, in some cases, the decoder may not possess full access rights to all channels. For example, some channels may be dedicated to pay per view programming, or may require a further subscription on the part of user. In this case, it is undesirable that a user has full audio and video access to a programme, even to a reduced screen version shown in the display windows 81.

Accordingly, in one embodiment the decoder application managing the mosaic display is adapted to monitor the length of time that the frame cursor rests in one position. After a period of, for example, 30 seconds, the application will compare the access rights of the channel in question with the access rights in the decoder in order to verify whether or not a user has full access to the programme or channel displayed in the mosaic window.

In the event that the decoder does not have the necessary access rights, the application acts to cut the audio output after 30 seconds such that the user can no longer hear the soundtrack associated with that programme.

In the event that the user does not have the necessary access rights, the frame cursor will jump to another window in this mosaic, such as the first element in the upper left hand corner of the first screen. Alternatively, the cursor may jump to a window element in a different mosaic. For a period of 5 minutes or so thereafter, the application may refuse to allow the cursor to be repositioned on the access prohibited window.

Figure 7:
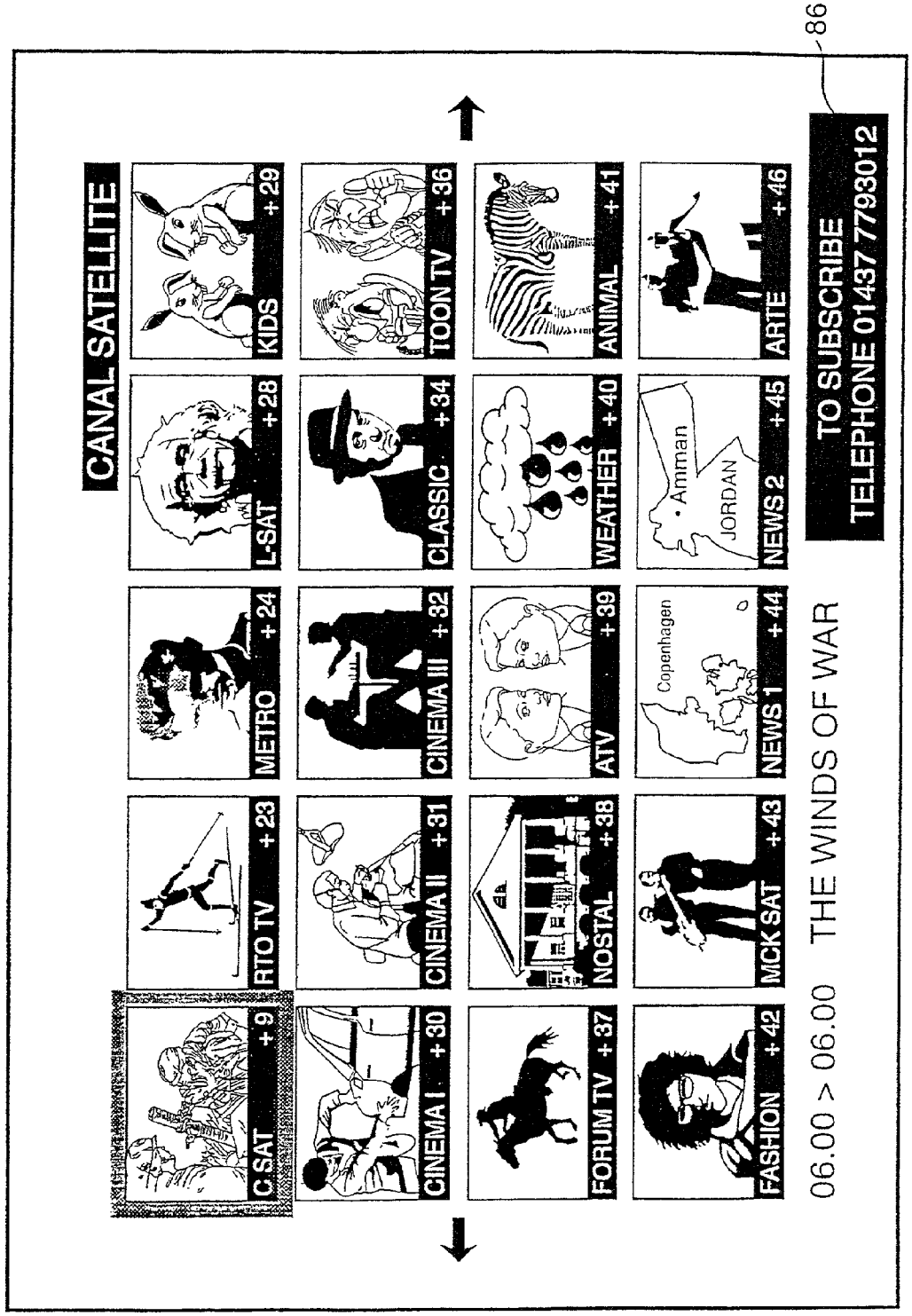
FIG. 7 shows subscription information in the screen display of FIG. 6 when the user does not have full rights to a channel.

In this event, the application may propose to the user the option of paying to access the channel in question, as shown at 86 in FIG. 7. If the user agrees, the application may change directly to the channel in question using, for example, credits stored in the subscription card of the user. Alternatively, the application may activate payment menu screens needed to allow the user to open a subscription. Such steps are standard, and will not be discussed here in any detail. As rights to pay-per-view events are purchased, the controller 20 may, under the control of an application, generate a cartoon image or icon representing the purchase of an event. For example, the controller may generate a cartoon image of a shopping trolley which begins to fill as events are purchased.

In an alternative to a time out procedure, the application can take the necessary steps to reposition the cursor and/or cut the audio output immediately the cursor rests on a window element for an access prohibited programme or channel.

The repositioning of the cursor need not depend on the access rights to a channel and/or programme displayed in a window. For example, in addition to or as an alternative to the above the decoder application may be arranged to automatically reposition the cursor after the expiry of a predetermined period of time. This can enable a user to "surf" across the mosaic, receiving for this predetermined period of time audio information for each window of the mosaic in turn. This surfing mode of operation can be initiated by pressing a pre-designated button on the remote control.

As an alternative to repositioning the cursor after the expiry of a predetermined period of time, the application may be adapted to issue automatically a request for full access rights to a channel and/or programme to which full audio and visual access is prohibited in the event that the cursor is placed over the window displaying this channel and/or programme for a predetermined period of time. This can enable automatic ordering of the full access rights to a programme and/or channel without any further input from the user.

In addition, or as an alternative, to cutting the audio output the application may also act to cut the video output. In some cases, for example, where adult material is displayed, the decoder may in all cases black out the video and audio display for the programme and channel in question, such that only the channel and programme title information is displayed in the bars 84, 82. Since such material may be deleted from all mosaic displays, regardless of the decoder access rights, this step may also be carried out upstream of the decoder at the transmission end.

Figure 8:
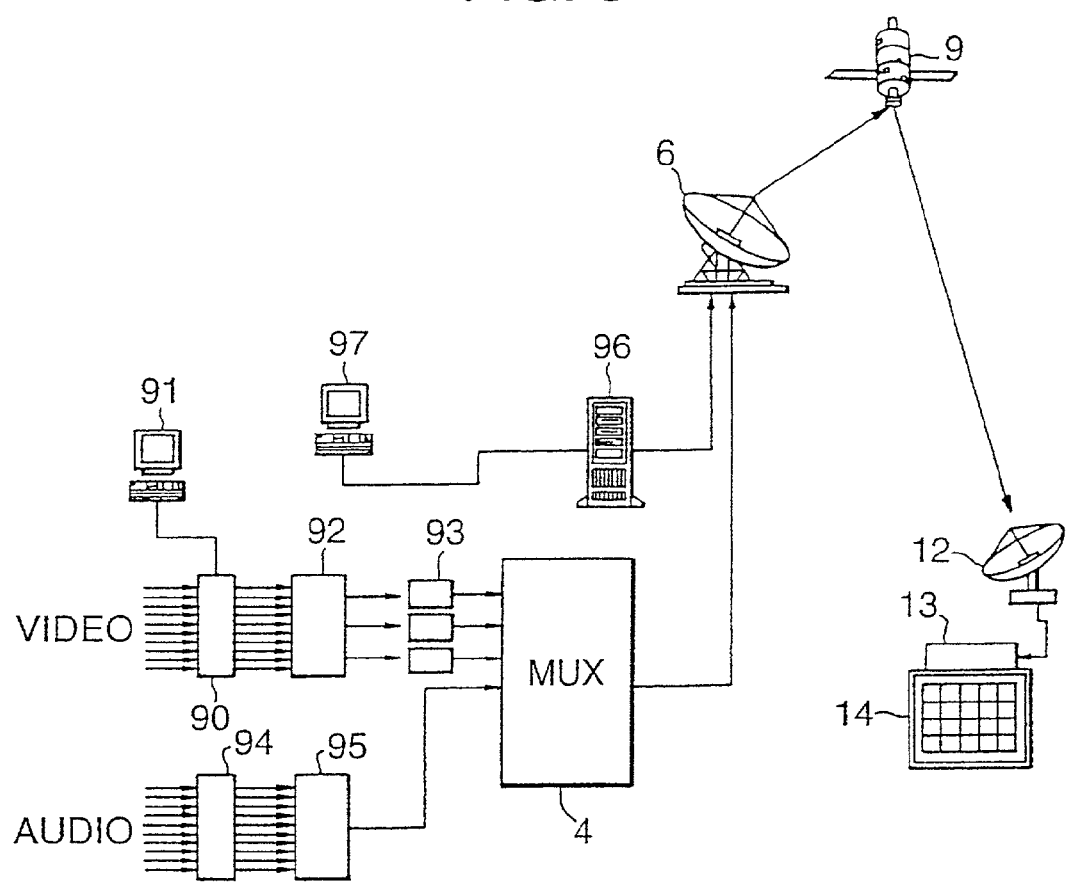
FIG. 8 shows the elements of a transmission system associated with the generation of the mosaic.

Referring to FIG. 8, the architecture of the elements of the transmission system associated with the generation of the mosaic channel will now be described. Video signals from sixty channels are received by a server 90 associated with a station 91. The server 90 acts to filter out these video signals which are not to be included in the mosaic, for example, video signals associated with adult only channels etc. The processed signals then pass to a processor 92 which resizes and repositions the video signals within a screen display so as to generate the three grille or mosaic screens shown at 93, which are then fed to the multiplexer 4.

In a similar manner, audio signals from each of the channels are filtered at 94 and assembled and assigned PID values at 95 before being fed to the multiplexer 4.

In addition to the broadcast audio and visual data, further data may be introduced by an SA/DA injection server 96 and an associated work station 97. In particular, the server and station introduce configuration data relating to the configuration of the elements in the mosaic together with pilot data containing the minimum information regarding the programmes broadcast on each channel. The pilot data may correspond to that used by the "Pilot" application and will be used by the application to generate the information bar 84 of the mosaic screen.

The configuration data typically includes a description of the number of mosaics, the size and position of each screen element within each mosaic, the desired size of the frame cursor, the limits of the cursor movement. This information will be used to enable the associated decoder application to correctly position and move the frame cursor. In addition, the data includes the position of each channel in the mosaics (page number and coordinates), the PID of the associated audio soundtrack in the assembled audio stream and the channel reference in the pilot data.

In order to enable the decoder application to change directly to a desired channel the configuration data should also include the details of the channel (frequency, PID value) associated with a given element. Access details (pay per view, subscription etc.) may also be included in order to enable the decoder application to carry out the operations described above to prevent a user from watching and listening to an access prohibited channel. Finally, the configuration data includes the PID value of each mosaic page and a default header message (if any) associated with that mosaic page.

Figure 10:
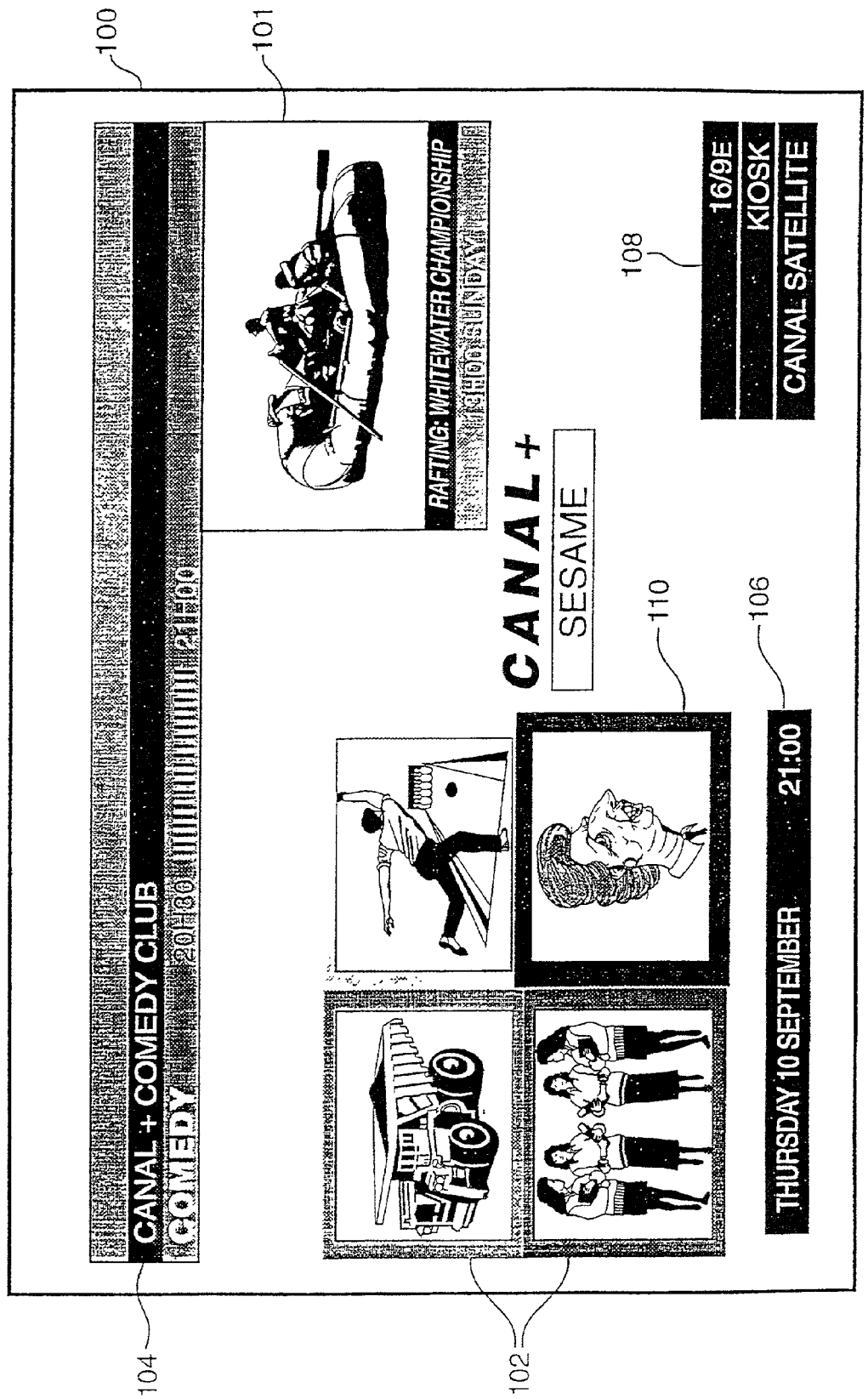
FIG. 10 shows a cursor positioned in the screen display of FIG. 9.
Figure 11:
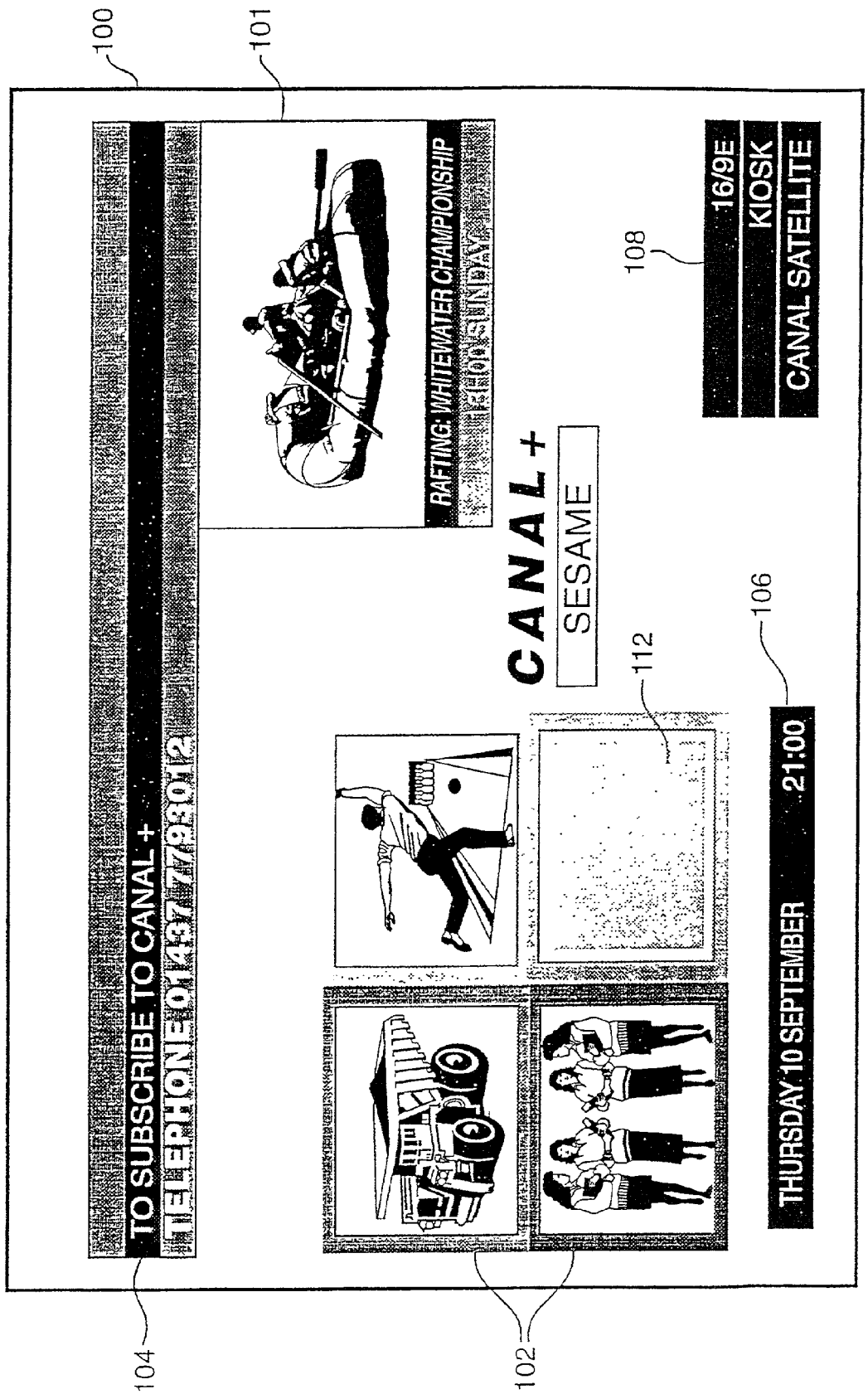
FIG. 11 shows subscription information in the screen display of FIG. 9 when the user does not have full rights to a channel.

An example of a mosaic formation in which at least a portion of the video output is blacked out is described below with reference to FIGS. 9 to 11.

The mosaic 100 is broadcast on channel number 1 and so when the numerical button "1" is selected on the remote control the decoder tunes to this frequency channel. In an alternative embodiment, the remote control may include a dedicated control button for tuning to this frequency channel.

The mosaic 100 is composed of a miniature screen display window 101 showing in real time a channel showing trailers for forthcoming events to be shown on one or more of the other channels, and four miniature screen display windows 102 each showing in real time the programme being shown on a respective channel. The mosaic also includes a general information bar 104, and a time and date bar 106. In addition to the mosaic windows 101, 102, the mosaic formation 100 includes button items 108, the purpose of which is described below.

Figure 9:
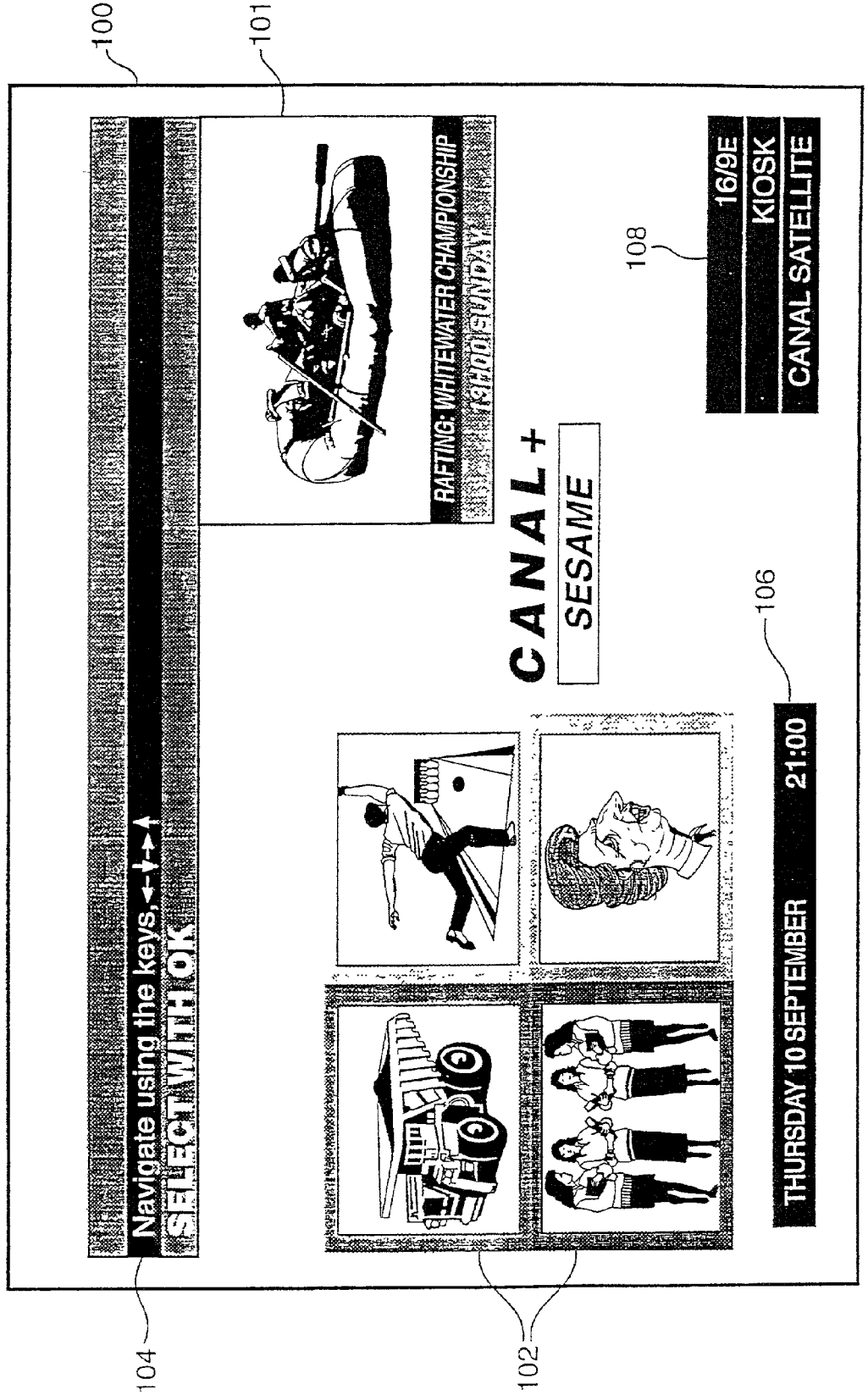
FIG. 9 shows a screen display associated with a second embodiment of a mosaic of channels.

When the mosaic 100 is first activated, the audio output is associated with the channel displayed in window 101 and, as shown in FIG. 9, the general information bar 104 informs the user as to how to navigate around the mosaic formation 100. Upon pressing one of the navigation arrows of the remote control, an application within the decoder generates a movable frame cursor over one of the windows 102, as shown at 110 in FIG. 10, or one of the button items 108. This cursor may be moved horizontally and vertically using the navigation arrows of the remote control.

The button items 108 provide rapid access to one of the channels as identified by the text appearing in each button item. For example, positioning the cursor over the button item 108 bearing the words "CANAL SATELLITE" and pressing "OK" causes the decoder to tune to the CANAL SATELLITE frequency channel.

With the cursor 110 positioned over one of the windows 102, the title of the programme currently being shown on the channel displayed in that window is displayed in the general information bar 104. The decoder additionally selects and plays the audio stream associated with this channel. Pressing "OK" on the remote control then causes the decoder to tune to the channel shown in that window.

As discussed above with reference to FIGS. 4 to 7, in some cases, the decoder may not possess full access rights to all channels. For example, some channels may be dedicated to pay per view programming, or may require a further subscription on the part of user. In this case, it is undesirable that a user has full audio and video access to a programme shown in the display windows 102. Restriction of the video output in the mosaic formation 100 is particularly desirable, as the window 102 is sufficiently large for a viewer to watch comfortably a programme for which he may not have full access rights.

Accordingly, in one embodiment the decoder application managing the mosaic display is adapted to monitor the length of time that the frame cursor 110 rests in one position. After a period of, for example, 30 seconds, the application will compare the access rights of the channel in question with the access rights in the decoder in order to verify whether or not a user has full access to the programme or channel displayed in the mosaic window 102.

In the event that the decoder does not have the necessary access rights, the application acts to switch the audio output to that associated with the channel displayed in window 101, and move the cursor accordingly (in this embodiment, the cursor is not generated when the audio output is associated with the channel displayed in window 101, although this is not essential). At substantially the same time, the video output for the channel displayed in the mosaic window 102 is cut as indicated at 112 in FIG. 11, thereby preventing the user from watching the programme. In this event, the application may propose to the user the option of paying to access the channel in question, as shown at 104 in FIG. 11.

The "black out" of the video output to one or more of the windows 102 may be achieved by simply cutting the video output to the portion of the screen in which the window is positioned. However, the black out may be achieved by any one of a number of different techniques, as discussed below.

As mentioned earlier, the decoder typically includes a 4-layer structure for generating the image to be displayed on the television set, the 4 layers being a stills layer, a moving image layer, a graphics layer, and a cursor layer. The graphics layer is preferably utilized for both icons (typically geometric shapes) and titles (usually but not always subtitles). The decoder application can control the display of text, images or a combination of text and images in the stills layer to overlay at least a portion of the mosaic window 102, thereby obscuring the video image displayed in that window.

This text and/or image display can take any suitable form. For example, the application may control the generation of:
(i) a box, rectangle or other geometric shape to at least partially overlay the window;
(ii) a logo for the channel displayed in that window;
(iii) a textual advertisement for a programme either currently being displayed, or to be displayed in the future on, that channel; and/or (iv) a still image associated with a programme either currently being displayed, or to be displayed in the future, on that channel.

These portions of the display may be previously stored in memory of the decoder for retrieval and use as required. For example, the text and/or image may be downloaded by the decoder together with the audiovisual information for the mosaic formation 100.

By providing an additional moving image layer, the mosaic window 102 may alternatively, or additionally, be blacked out by a promotional video clip for that channel. This video clip may also be downloaded by the decoder together with the audiovisual information for the mosaic formation 100.

The decoder may be programmed such that a mosaic channel will always be displayed at start-up of the decoder. Additionally, whilst the cursor may also be fixed on the same channel every time the mosaic formation is first activated, other possibilities exist. For example, when activating the decoder, a mosaic may be displayed with the cursor highlighting the last channel viewed by the user. When changing between mosaic screens, one channel may be seen on all of the screens. For example, in FIGS. 5 and 6 channel 9 is displayed. Equally, when the user changes from one channel to the mosaic channel, the mosaic screen including this channel highlighted by the cursor may be displayed, providing a sort of "zoom-out" effect from a full-screen channel display to a miniature version in one window element of the mosaic.

In the embodiments described above, pressing the "OK" button when the cursor is positioned over a particular mosaic window causes the decoder to tune to the frequency of the channel displayed in that particular mosaic window. However, pressing an alternative button on the remote control can activate one of a number of different applications stored in the decoder. For example, pressing one of the numerical buttons B to E (button A typically being reserved for adjustment of the volume setting, as shown in FIG. 4) may cause the decoder to launch an electronic programme guide (EPG) associated with the channel displayed in the window over which the cursor is positioned.

Figure 12:
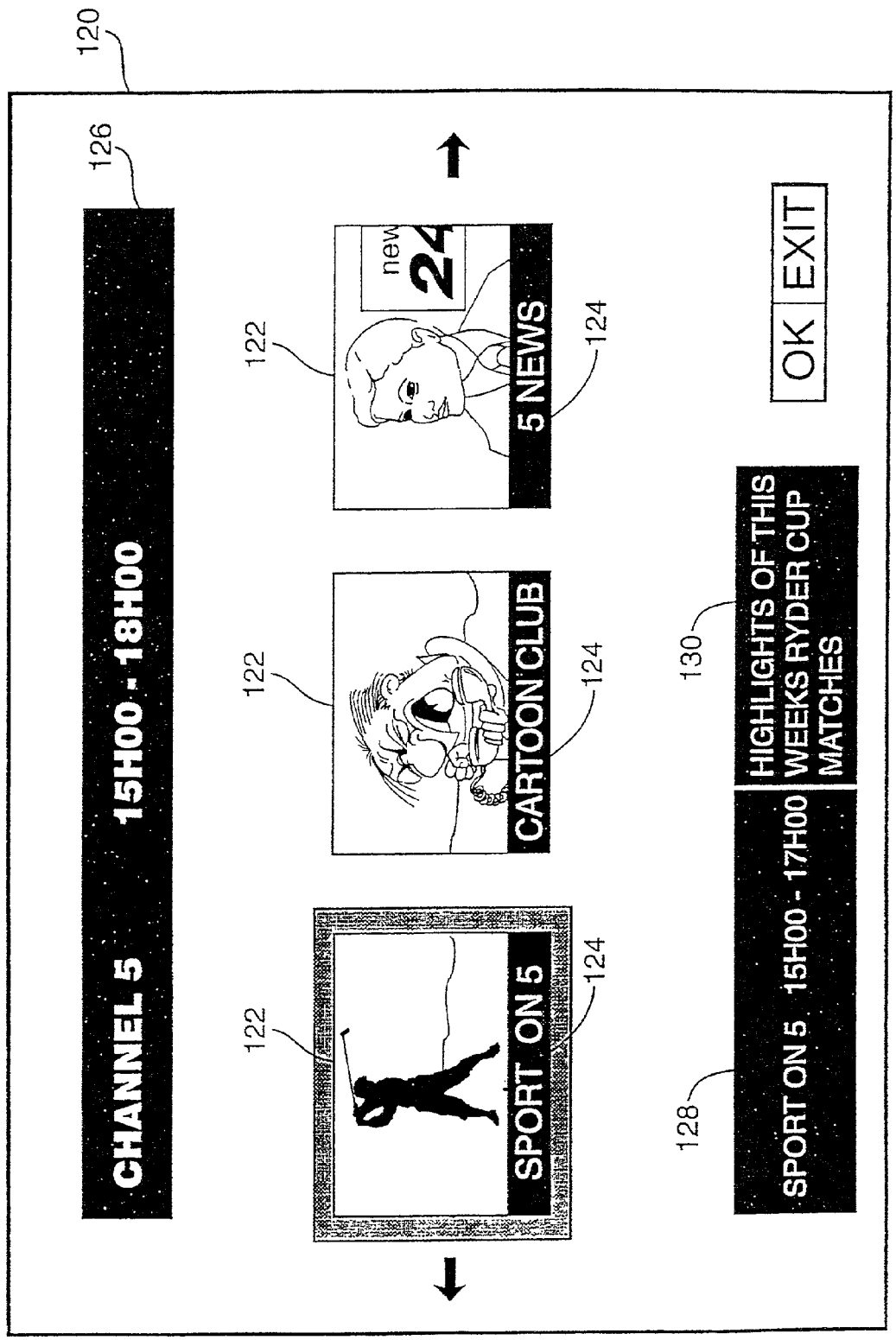
FIG. 12 shows a screen display of an electronic programme guide in the form of a mosaic of windows.

The EPG can take one of many forms. For example, the EPG may comprise a textual display of a schedule of forthcoming programmes on the channel. Such displays are well known in the art and will not be described further here. Alternatively, as shown in FIG. 12, the EPG may comprise a mosaic display 120 comprising a plurality of mosaic windows 122 (although only three windows are shown in FIG. 12, any number or arrangement of windows is possible). Each window includes an image (still or moving) of the forthcoming programme together with an indication 124 of the title of that programme. The mosaic also includes a general information bar 126 indicating the channel name and the time period covered by the mosaic 120.

An application within the decoder generates a movable frame cursor shown at 127. This cursor may be moved horizontally and vertically using the navigation arrows of the remote control. Positioning of the cursor over a window causes the title and duration of the programme to be displayed, as shown at 128 in FIG. 12, together with a summary of the contents of the programme, as shown as 130 in FIG. 12.

Access to other EPG mosaics displays for that channel may be necessary to display programmes shown during a later time period. For example, when the cursor is positioned over window 122 on the right hand side of the mosaic, selection of the right facing navigation arrow will cause the display to change to another mosaic of 3 programmes to be shown during a later time period. Similarly, when the cursor is in the left hand side of the mosaic 120, selection of the left facing navigation arrow will cause the display to change to show another mosaic of 3 programmes shown, or to be shown, during an earlier time period.

The EPG may be launched by tuning the decoder to a frequency channel containing the mosaic formation 120. Alternatively, the EPG may be received by the decoder together with the audiovisual information for the mosaic formations 80 and 100.

In addition to, or alternatively to, the form of EPG described with reference to FIG. 12, the EPG may take the form of the mosaic formation 80 shown in FIG. 4 in order to display information regarding programmes to be shown on all of the channels at a given time. In this example, each window 81 displays a still or moving image from a programme to be shown at a particular time on that channel, for example one hour in the future. The particular time is preferably indicated in information bar 84. Movement of the cursor around the mosaic formation causes the title of the selected programme to be displayed in the information bar 84. Selection of a predetermined button on the remote controller causes the EPG to display a similar mosaic for a different time, for example two hours in the future.

As an alternative to, or in addition to, launching an EPG, pressing one of the buttons B to E can cause the decoder to display further information about the programme shown in the window over which the cursor is positioned. This information preferably includes the title of the programme, start time, end time and/or duration, and a summary of the contents of the programme. This further information may be received by the decoder together with the audiovisual information for the mosaic information. Alternatively, it may be downloaded by the decoder as and when required for display.

In the embodiments of the mosaic formation described with reference to FIGS. 4 to 11, the cursor maintains a constant size and format (colour, shape, etc) as it is moved across the mosaic. Alternatively, the format of the cursor may vary depending on a characteristic of the window over which the cursor is positioned. In one embodiment, the application may change the colour of the cursor depending on the access rights assigned to the programme and/or channel displayed in the window over which the cursor is positioned. For example, the cursor may be green if the user has full access rights to the programme and channel displayed in the window over which the cursor is positioned, and red if the user does not have full access rights to the programme and/or channel displayed in the window over which the cursor is positioned.

The cursor may also change depending on characteristics other than these particular access rights. For example, the user can assign a particular channel as a "favourite" channel, for example, by pressing a predetermined button on the remote control when the cursor is positioned over the window displaying that channel. The assignment of this channel as a favourite channel is stored in the memory of the decoder, so that when the cursor is subsequently positioned over the window displaying that channel, the cursor is displayed in a different colour, for example, blue. As an alternative to selecting a favourite channel via the mosaic formation, an application stored in the decoder may display a list of all of the channels received by the decoder, the user selecting various channels on the list as the favourite channels using the remote control.

In addition to this "favourite channel" selection using the cursor, the format of the cursor may vary depending on the nature of the programme displayed in the window over which the cursor is positioned. For example, the cursor may take a different format depending on the rating (such as children's programme, adults only) of the programme, the subject matter (such as sport, wildlife, politics) of the programme, and so on.

In another arrangement, the visual and/or audio black out of certain windows of the mosaic formation may be additionally determined by the user. For example, the user may wish to restrict all access to channels which normally show adult programmes if such access is not restricted by the broadcaster. By pressing a button of the remote control when the cursor is positioned over a window displaying a programme and/or channel to which the user wishes to restrict access, the user can instruct the decoder to prevent all access to that channel. This information is stored in the decoder so that when the mosaic formation is subsequently activated, the video and audio information for that channel is blacked out. To ensure security, the decoder may request that a PIN number is entered by the user before the access rights are altered.

In the embodiments described with reference to FIGS. 4 to 11, the channels are displayed in a formation which is determined by the broadcaster of the audiovisual data for the channels. Thus, various favourite channels of the user may be randomly spread about the mosaic formation. In order to enable the positions of the various windows in the formation, in one embodiment, the decoder application is arranged to control the relative positions of the windows within the mosaic formation.

As mentioned earlier, the decoder receives configuration data from the broadcaster which includes a description of the number of mosaics and the size and position of each screen element within each mosaic. The decoder application is able to re-arrange the received positional information so that the positions of the screen elements on the screen meet the requirements of the user.

In one arrangement, the decoder application is arranged to control the relative positions of the windows of the mosaic in response to the received access rights to the channels or programmes displayed in the windows. For example, pay-per-view programmes and channels to which the user does not have full access rights may be shown in neighbouring windows of the mosaic formation.

Alternatively, or in addition, the decoder application may be arranged to control the relative positions of the windows of the mosaic in response to commands output from the remote control. This can enable the relative positions of the windows in the mosaic formation to be changed easily by the user, for example, by pressing one of the buttons B to E of the remote control. For example, the mosaic windows my be sorted by theme, such as sport, wildlife, children's programmes, adult programmes, and so on at the touch of a button.

FIGS. 4 to 12 have illustrated arrangements of mosaic formations of windows displaying programmes shown on television channels. However, the mosaic formation is not limited to solely television programmes. For example, the mosaic formation 80 shown in FIG. 4 may include one or more windows associated with respective radio channels. If so, the mosaic windows for these radio channels display a logo for the radio station.

Figure 13:
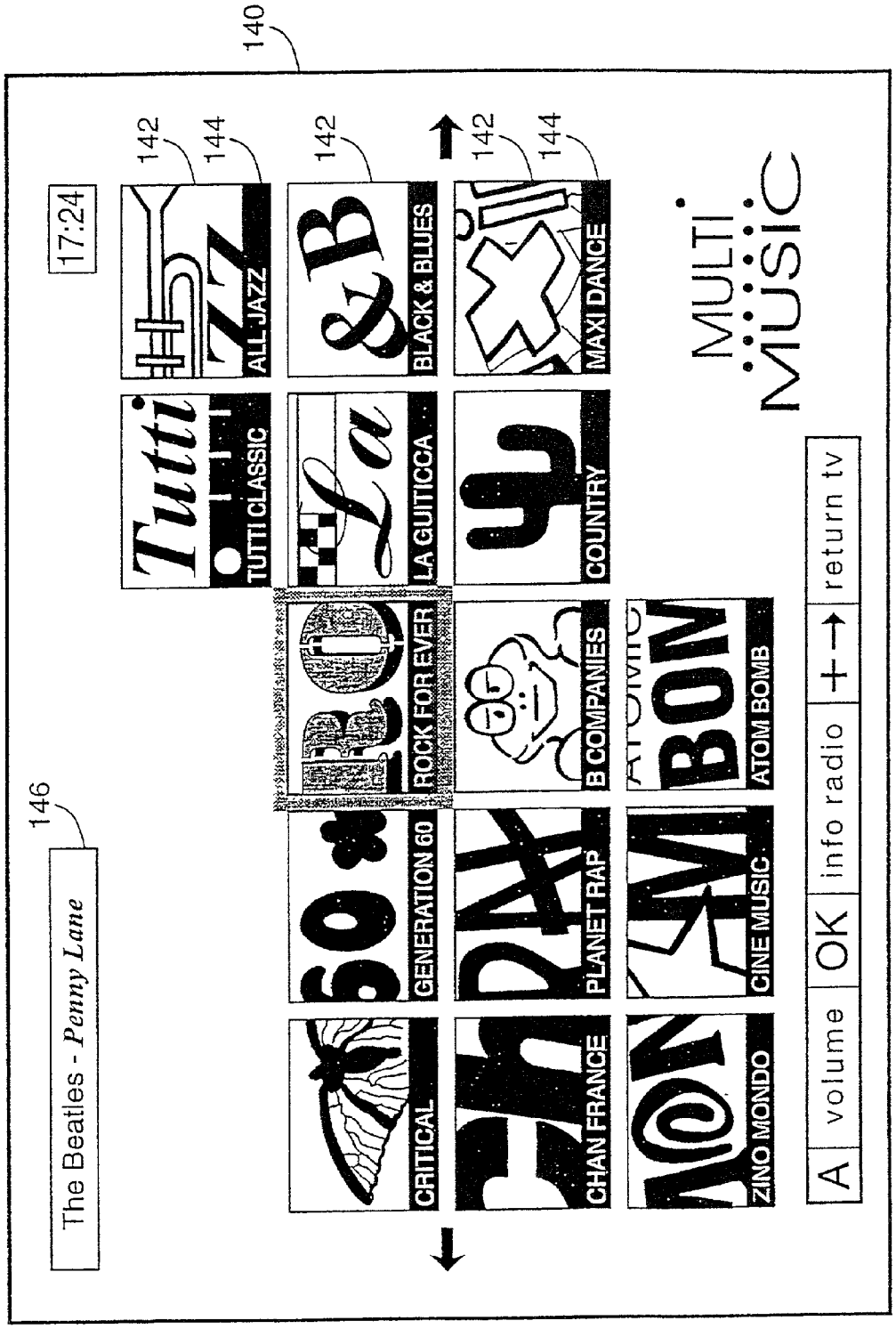
FIG. 13 shows a screen display associated with a mosaic of radio channels.

The decoder may also receive frequency channels associated with other mosaic formations. By way of example, FIG. 13 illustrates a mosaic formation 140 of windows 142, each window displaying a logo of a radio channel and, at 144, an indication of the name of the channel shown in the window 142. The mosaic also includes a general information bar 146. An application within the decoder generates a movable frame cursor shown at 148. This cursor may be moved horizontally and vertically using the navigation arrows of the remote control. For example, in FIG. 5, the cursor 83 has been moved to select the first-down, third-across window. An indication of the music currently being played on the channel displayed in this window is displayed in the information bar 146. The decoder additionally selects and plays the audio stream associated with this channel.

Figure 14:
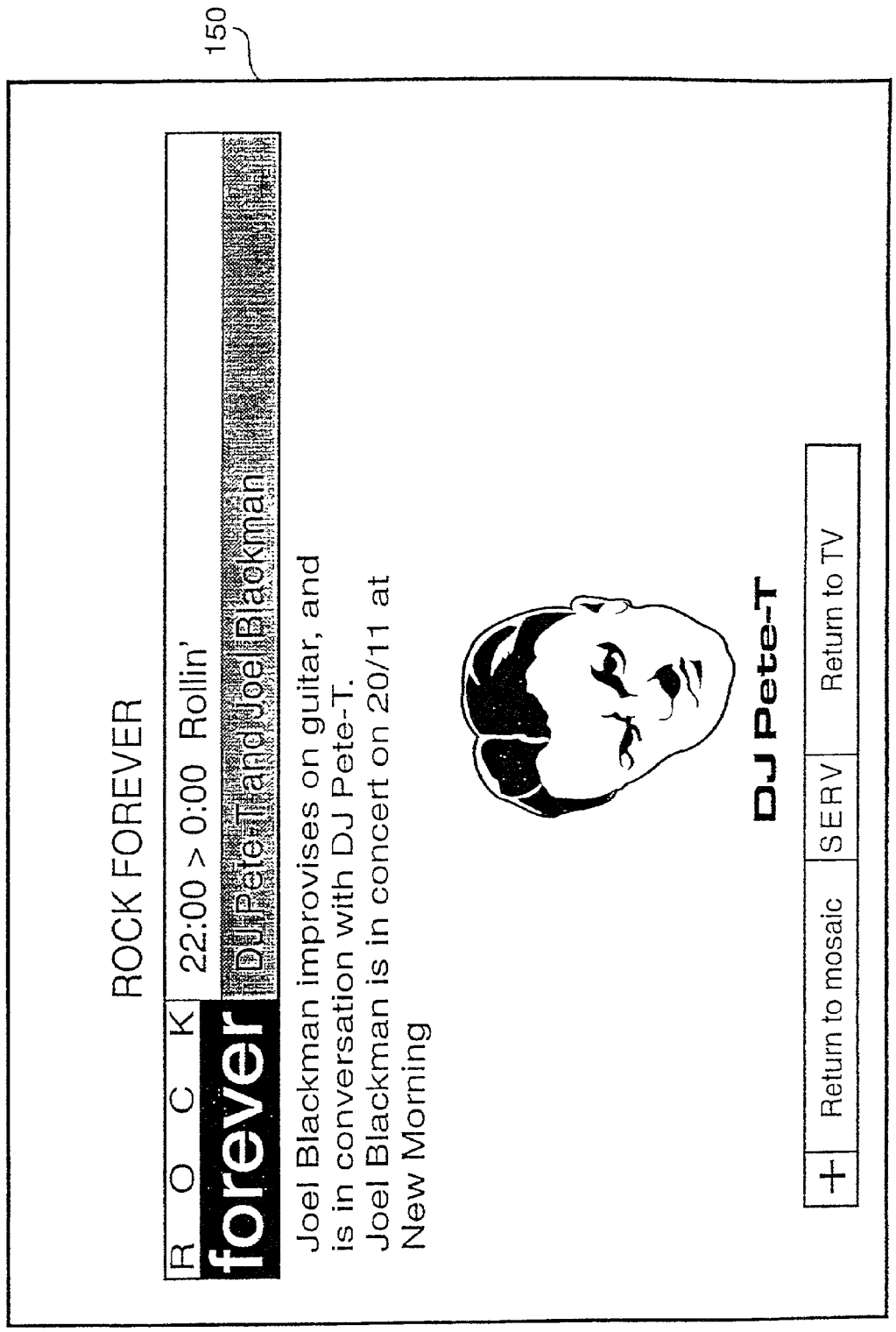
FIG. 14 shows a screen display of information relating to a radio channel.

Pressing "OK" on the remote control then causes the decoder to generate the display of further information associated with the selected channel. For example, as shown in FIG. 14, pressing "OK" on the remote control causes the decoder to generate a display 150 of additional information regarding the show currently being transmitted by that channel. Alternatively, pressing "OK" can cause the decode to display a textual schedule of forthcoming music to be played on the channel. or further information regarding the current piece of music being played.

Figure 15:
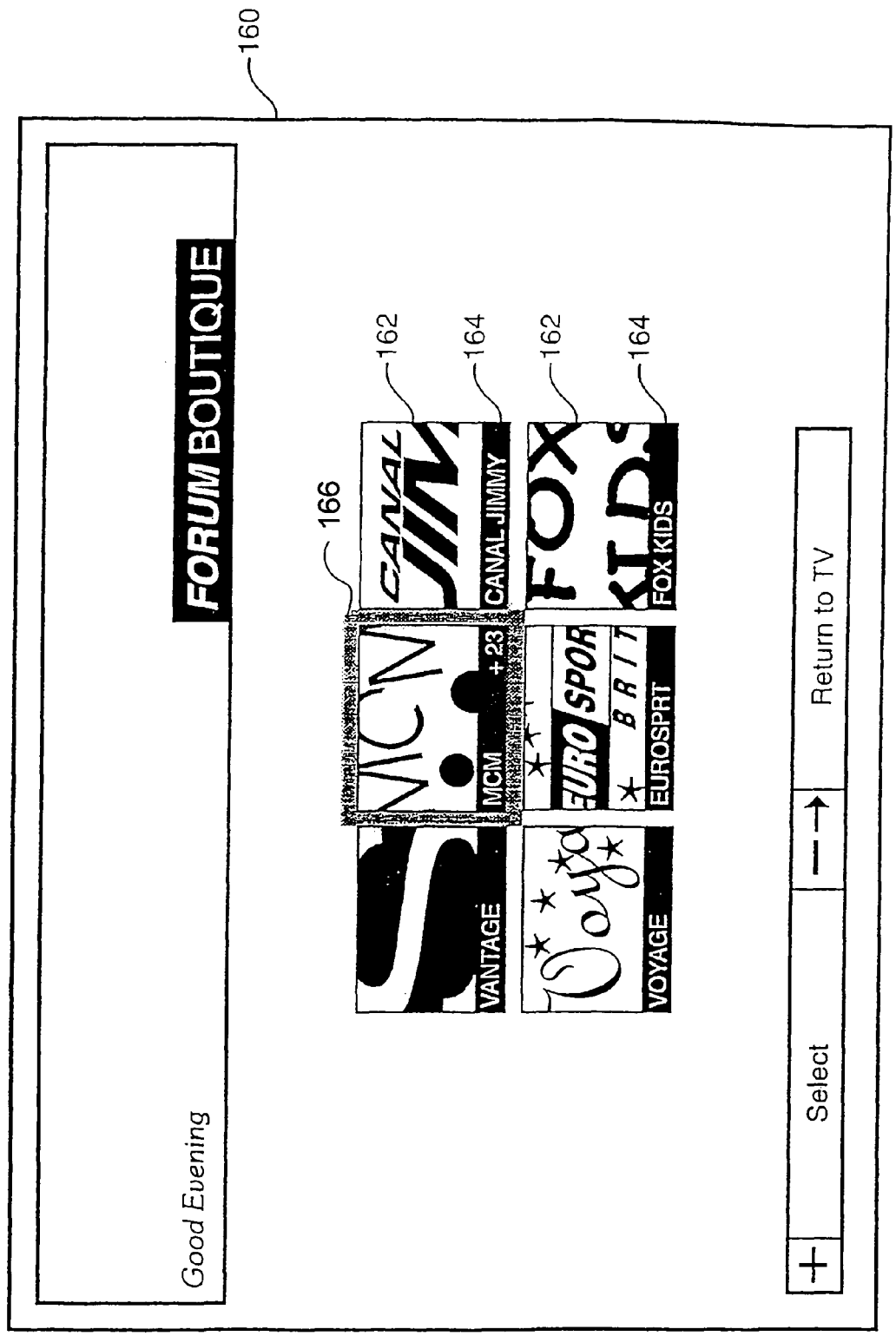
FIG. 15 shows a screen display associated with a mosaic of interactive applications.

FIG. 15 illustrates a mosaic formation 160 of windows 162 each associated with a respective interactive application stored in the memory of the decoder. Each window contains a logo for the application together with an indication 164 of the name of the application. An application within the decoder generates a movable frame cursor shown at 166. This cursor may be moved horizontally and vertically using the navigation arrows of the remote control. For example, in FIG. 15, the cursor has been moved to select the first-down, second-across window. Pressing "+" on the remote control causes the interactive application associated with that logo, for example a teleshopping application, to be launched.

The invention claimed is:

1. A decoder for controlling the display of a plurality of digital television channels, wherein said decoder is configured to:
   receive a program in encrypted form on a first channel of the plurality of digital television channels, wherein the program comprises both encrypted audio and encrypted video;
   receive the program in unencrypted form on a second channel of the plurality of digital television channels, wherein the second channel corresponds to a mosaic comprising a plurality of windows;
   create the mosaic comprising a plurality of unencrypted programs, including the program in unencrypted form, wherein each of the plurality of encrypted unencrypted programs is shown within a respective window of the plurality of windows;
   display the mosaic on the second channel;
   receive a selection for the program in the mosaic on the second channel; and
   determine that full access rights are not available to a user for the program while the program is displayed in encrypted form in the mosaic on the second channel,
   wherein the decoder is configured to prohibit one of only audio access and only visual access to the program while the program is displayed in the mosaic on the second channel upon determining that full access rights are not available for the program, wherein the one of only audio access and only visual access is prohibited for the program in the mosaic on the second channel after a predetermined length of time, wherein the program remains in encrypted form on the first channel so that both audio access and visual access to the program are prohibited on the first channel, and wherein complete audio and visual access to the program is provided on the second channel during the predetermined length of time.

2. The decoder according to claim 1, wherein the decoder receives access rights data together with audiovisual data for creating the mosaic.

3. The decoder according to claim 2, wherein the decoder is further configured to issue a request for full audio and visual access to one of the first channel and the program displayed in the respective window.

4. The decoder according to claim 3, wherein the decoder is arranged automatically to issue said request when a cursor has been positioned over said desired window for a predetermined period of time.

5. The decoder according to claim 1, wherein the decoder is further configured to generate a cursor for display with the mosaic, said cursor being selectively movable over the plurality of windows of the mosaic to enable selection of a desired window within the mosaic.

6. The decoder according to claim 5, wherein the decoder is further configured to generate audio information associated with the first channel in response to the positioning of the cursor over said desired window displaying said first channel.

7. The decoder according to claim 6, wherein the decoder is further configured to prohibit the generation of said audio information according to received access rights.

8. The decoder according to claim 7, wherein the decoder is configured to prohibit the generation of said audio information if the cursor is positioned over said desired window for longer than a predetermined length of time.

9. The decoder according to claim 5, wherein the decoder is further configured to automatically re-position the cursor in the event that the cursor is placed over said desired window displaying one of a program or a channel to which full audio and visual access is prohibited.

10. The decoder according to claim 9, wherein the cursor is re-positioned after the expiration of a predetermined period of time.

11. The decoder according to claim 5, wherein an attribute of the cursor is changed depending on a characteristic of at least one of the program and the first channel displayed in a window over which the cursor is positioned.

12. The decoder according to claim 11, wherein a color of said cursor is changed depending on said characteristic of at least one of the program and the first channel displayed in the window over which the cursor is positioned.

13. The decoder according to claim 11, wherein the decoder receives data for assigning said characteristic from a remote control handset associated with the decoder and assigns said characteristic in response to said received data.

14. The decoder according to claim 5, wherein the decoder is turned to the first channel displayed in the desired window upon selection of the desired window.

15. The decoder according to claim 5, comprising means for generating a display comprising information regarding the program displayed in the desired window upon selection of the desired window.

16. The decoder according to claim 15, comprising means for communicating with a communications centre to obtain said information regarding the program displayed in the desired window.

17. The decoder according to claim 16, wherein the decoder comprises a modem for dialing up said communications centre to supply a request for said information to the communications centre.

18. The decoder according to claim 1, wherein said decoder is further configured to:
generate a cursor for display with the mosaic, said cursor being selectively movable over the plurality of windows of the mosaic to enable selection of a desired window within the mosaic;
generate a display comprising information regarding the program displayed in the desired window upon selection of the desired window; and
communicate with a communications centre to obtain said information regarding the program displayed in the desired window.

19. The decoder according to claim 5, wherein the decoder is further configured to generate a display comprising a forthcoming program schedule for the channel displayed in the desired window upon selection of the desired window.

20. The decoder according to claim 19, wherein said forthcoming program schedule comprises a textual display of program schedule information.

21. The decoder according to claim 19, wherein said forthcoming program schedule comprises a display of a plurality of pictorial images associated with respective forthcoming programs in the respective windows of the mosaic.

22. The decoder according to claim 21, wherein at least one of said plurality of pictorial images comprises video footage associated with the respective forthcoming program.

23. The decoder according to claim 1, wherein said decoder is configured to receive access rights from a remote control handset associated with the decoder.

24. The decoder according to claim 23, wherein said decoder is further configured to receive a PIN number from the remote control handset, wherein said decoder authenticates the received PIN number and, upon authentication of the received PIN number, permits reception of the access rights.

25. The decoder according to claim 1, wherein the decoder prohibits the generation of at least a portion of video information in said plurality of windows in dependence on the full access rights to one of a program and a channel displayed in a window among said plurality of windows.

26. The decoder according to claim 25, wherein the decoder controls the display of a picture in said window instead of said at least a portion of video information.

27. The decoder according to claim 26, wherein said picture comprises a logo associated with the channel displayed in said window.

28. The decoder according to claim 26, wherein said picture comprises an image associated with the program displayed in said window.

29. The decoder according to claim 25, wherein the decoder controls the display of an advertisement in said window instead of said at least a portion of video information.

30. The decoder according to claim 25, wherein the decoder controls the display of further video information in said window instead of said at least a portion of video information.

31. The decoder according to claim 30, wherein said further video information comprises promotional video information.

32. The decoder according to claim 1, wherein the decoder is further configured to generate a message informing the user of the full access rights to one of the program and the first channel in the event of the positioning of the cursor on a window displaying said one of the program and the first channel.

33. The decoder according to claim 1, wherein the decoder is configured to positionally control the relative positions of said plurality of windows within the mosaic formation, wherein the relative position of said plurality of windows is controlled based on the full access rights to programs displayed in the mosaic.

34. The decoder of claim 1, wherein the program in the mosaic is completely blacked out by the decoder when the full access rights are not received after the predetermined length of time.

35. The decoder of claim 1, wherein full access to non-selected unencrypted programs in the mosaic is permitted.

36. The decoder of claim 1, wherein video access is prohibited to the program in the mosaic on the second channel.

37. A method of controlling the display of a plurality of digital television channels, comprising:
- receiving a program in encrypted form on a first channel of the plurality of digital television channels, wherein the program comprises both encrypted audio and encrypted video;
- receiving the program in unencrypted form on a second channel of the plurality of digital television channels, wherein the second channel corresponds to a mosaic comprising a plurality of windows;
- creating the mosaic comprising a plurality of unencrypted programs, including the program in unencrypted form, wherein each of the plurality of unencrypted programs is shown within a respective window of the plurality of windows;
- displaying the mosaic on the second channel;
- receiving a selection for the program in the mosaic; and
- determining that full access rights are not available to a user for the program while the program is displayed in encrypted form in the mosaic on the second channel,
- wherein a decoder is configured to prohibit one of only audio access and only visual access to the program while the program is displayed in the mosaic on the second channel upon determining that full access rights are not available for the program, wherein the one of only audio access and only visual access is prohibited for the program in the mosaic on the second channel after a predetermined length of time, wherein the program remains in encrypted form on the first channel so that both audio access and video access are prohibited on the first channel, and wherein complete audio and visual access to the program is provided on the second channel during the predetermined length of time.

38. The method according to claim 37, wherein access rights are received together with audiovisual data for creating the mosaic.

39. The method according to claim 37, wherein a cursor is generated for display with the mosaic, said cursor being selectively movable over the plurality of windows of the mosaic to enable selection of a desired window within the mosaic.

40. The method according to claim 39, wherein audio information associated with the first channel is generated in response to the positioning of the cursor over said desired window displaying said first channel.

41. The method according to claim 40, wherein the generation of said audio information is prohibited according to received access rights.

42. The method according to claim 41, wherein the generation of said audio information is prohibited if the cursor is positioned over said desired window for longer than a predetermined length of time.

43. The method according to claim 39, wherein the cursor is automatically re-positioned in the event that the cursor is placed over said desired window displaying one of a program or a channel to which full audio and visual access is prohibited.

44. The method according to claim 43, wherein the cursor is repositioned after the expiration of a predetermined period of time.

45. The method according to claim 39, wherein an attribute of the cursor is changed depending on a characteristic of at least one of the program and the first channel displayed in the window over which the cursor is positioned.

46. The method according to claim 45, wherein the colour of said cursor is changed depending on said characteristic of at least one of the program and the first channel displayed in the window over which the cursor is positioned.

47. The method according to claim 45, wherein data for assigning said characteristic is received from a remote control handset associated with the decoder, said characteristic being assigned in response to the received data.

48. The method according to claim 39, wherein the decoder is turned to the first channel displayed in the desired window upon selection of the desired window.

49. The method according to claim 39, wherein a display comprising information regarding the program displayed in the desired window is generated upon selection of the desired window.

50. The method according to claim 39, wherein a display comprising a forthcoming program schedule for the channel displayed in the desired window is generated upon selection of the desired window.

51. The method according to claim 39, wherein a forthcoming program schedule comprises a textual display of program schedule information.

52. The method according to claim 39, wherein a forthcoming program schedule comprises a display of a plurality of pictorial images associated with respective forthcoming programs in the respective windows of the mosaic.

53. The method according to claim 37, further comprising:
- generating a cursor for display with the mosaic, said cursor being selectively movable over the plurality of windows of the mosaic to enable selection of a desired window within the mosaic;
- generating a display comprising information regarding the program displayed in the desired window upon selection of the desired window; and
- communicating with a communications centre to obtain said information regarding the program displayed in the desired window.

54. The method according to claim 53, wherein the generation of at least a portion of video information in said desired window is prohibited in dependence on access rights to one of the program and the first channel displayed in that desired window.

55. The method according to claim 37, wherein access rights are received from a remote control handset associated with the decoder.

56. The method according to claim 55, wherein a PIN number is received from the remote control handset, the received PIN number being authenticated to, upon authentication of the received PIN number, permit reception of the access rights.

57. The method according to claim 37, wherein the generation of at least a portion of video information in a window is prohibited in dependence on access rights to one of a program and a channel displayed in said window.

58. The method according to claim 57, wherein a picture is displayed in said window instead of said at least a portion of video information.

59. The method according to claim 58, wherein said picture comprises a logo associated with the channel displayed in said window.

60. The method according to claim 59, wherein said picture comprises an image associated with the program displayed in said window.

61. The method according to claim 57, wherein an advertisement is displayed in said window instead of said at least a portion of video information.

62. The method according to claim 57, wherein further video information is displayed in said window instead of said at least a portion of video information.

63. The method according to claim 62, wherein said further video information comprises promotional video information.

64. The method according to claim 37, wherein a message is generated informing the user of the full access rights to one of the program and the first channel in the event of the positioning of the cursor on a said window displaying said program and said channel.

65. The method according to claim 37, comprising controlling the relative positions of said plurality of windows within the mosaic.

66. The method according to claim 65, wherein the relative positions of said plurality of windows are controlled in response to received access rights to the plurality of digital television channels or programs displayed in each of said plurality of windows.

67. The method according to claim 65, wherein the relative positions of said plurality of windows of the mosaic are controlled in response to received window positioning data for controlling the relative positions of said plurality of windows within the mosaic.

68. The method according to claim 65, wherein the relative positions of the plurality of windows of the mosaic are controlled according to a program characteristic of programs normally shown on the plurality of digital television channels displayed in the plurality of windows.

69. The method according to claim 65, wherein a window displaying one of a particular channel and a particular program is maintained in a constant position in the mosaic.

70. The method of claim 37, wherein the program in the mosaic is completely blacked out by the decoder when the full access rights are not received after the predetermined length of time.

71. A decoder for controlling the display of a plurality of digital television channels, said decoder comprising:
  means for receiving a first program in encrypted form on a first channel of the plurality of digital television channels and a second program in encrypted form on a second channel of the plurality of digital television channels, wherein the first and second programs comprise both encrypted audio and encrypted video;
  means for receiving the first and second programs in unencrypted form on a third channel of the plurality of digital television channels, wherein the third channel corresponds to a mosaic comprising a plurality of windows;
  means for displaying the mosaic comprising a plurality of unencrypted programs on the third channel, including the first and second programs in unencrypted form;
  means for receiving a selection from a user for access to the first program displayed in the mosaic on the third channel; and
  means for determining that full access rights are not available to the user for the first program while the first program is displayed in encrypted form in the mosaic on the third channel,
  wherein the decoder is configured to prohibit one of only audio access and only visual access to the unencrypted form of the first program while the first program is displayed in the mosaic upon determining that full access rights are not available for the first program, and
  wherein the one of only audio access and only visual access is prohibited for the first program in the mosaic on the third channel after a predetermined length of time, wherein the first program remains in encrypted form on the first channel so that both audio access and visual access are prohibited on the first channel, and wherein complete audio and visual access to the first program is provided on the third channel during the predetermined length of time.

72. The decoder according to claim 71, further comprising:
  means for determining whether the user is permitted full access to the second program based on access rights associated with the user;
  means for permitting one of only audio access or only visual access by the user to the unencrypted form of the second program displayed in the mosaic formation, when the user is not permitted full access to the second program; and
  means for providing complete audio and visual access to the user to the second program on the second channel, when full access rights associated with the user are received for the second program.

* * * * *